United States Patent
Silva

(10) Patent No.: US 11,052,962 B2
(45) Date of Patent: Jul. 6, 2021

(54) BICYCLE WITH ATTACHMENTS

(71) Applicant: 3G BIKES LLC, Whittier, CA (US)

(72) Inventor: Clever Silva, Whittier, CA (US)

( * ) Notice: Subject to any disclaimer, the term of this patent is extended or adjusted under 35 U.S.C. 154(b) by 107 days.

(21) Appl. No.: 15/681,137

(22) Filed: Aug. 18, 2017

(65) Prior Publication Data

US 2018/0050756 A1 Feb. 22, 2018

Related U.S. Application Data

(60) Provisional application No. 62/377,041, filed on Aug. 19, 2016, provisional application No. 62/530,551, filed on Jul. 10, 2017.

(51) Int. Cl.
| | | |
|---|---|---|
| *B62K 19/40* | (2006.01) |
| *B62K 3/02* | (2006.01) |
| *B62J 7/06* | (2006.01) |
| *B62J 11/00* | (2020.01) |
| *B62J 9/22* | (2020.01) |
| *B62K 19/34* | (2006.01) |
| *B62M 1/36* | (2013.01) |

(52) U.S. Cl.
CPC .............. *B62K 19/40* (2013.01); *B62J 7/06* (2013.01); *B62J 9/22* (2020.02); *B62J 11/00* (2013.01); *B62K 3/02* (2013.01); *B62K 19/34* (2013.01); *B62M 1/36* (2013.01)

(58) Field of Classification Search
CPC . B62K 19/40; B62K 3/02; B62K 19/34; B62J 7/06; B62J 9/005; B62J 11/00
USPC .......................................................... 280/202
See application file for complete search history.

(56) References Cited

U.S. PATENT DOCUMENTS

| | | | | |
|---|---|---|---|---|
| 3,995,803 A * | 12/1976 | Uitz | ........................... | B62J 7/06 |
| | | | | 224/432 |
| 5,522,527 A * | 6/1996 | Tsai | ......................... | B62J 11/00 |
| | | | | 224/414 |
| 6,173,801 B1 * | 1/2001 | Kakutani | ................. | B62M 6/40 |
| | | | | 180/206.3 |
| 2008/0116238 A1* | 5/2008 | Tseng | ....................... | B62J 11/00 |
| | | | | 224/414 |
| 2010/0295264 A1* | 11/2010 | Denais | ...................... | B60C 7/10 |
| | | | | 280/260 |

FOREIGN PATENT DOCUMENTS

DE 29612547 U1 * 9/1996 .............. B62J 9/003

* cited by examiner

*Primary Examiner* — Jacob D Knutson
(74) *Attorney, Agent, or Firm* — Tommy SF Wang; Wang IP Law Group, P.C.

(57) ABSTRACT

A bicycle comprising a front wheel and a rear wheel supporting a frame. The frame includes a vertical plate that is configured to support an attachment such as a cup holder, a front rack, or a front basket. In some configurations, a cup holder is provided on each side of the vertical plate. In some configurations, a front basket is foldable and/or removable.

12 Claims, 28 Drawing Sheets

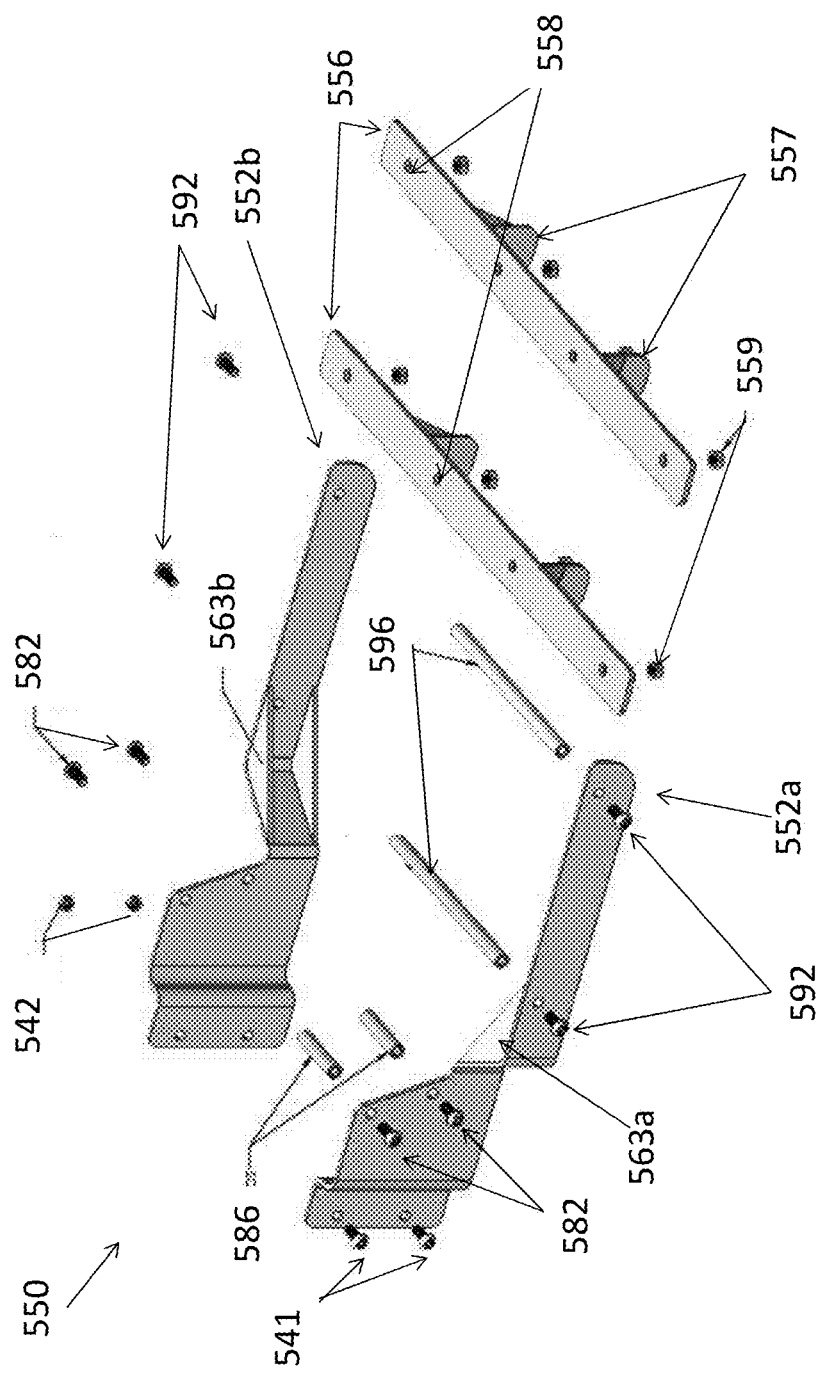

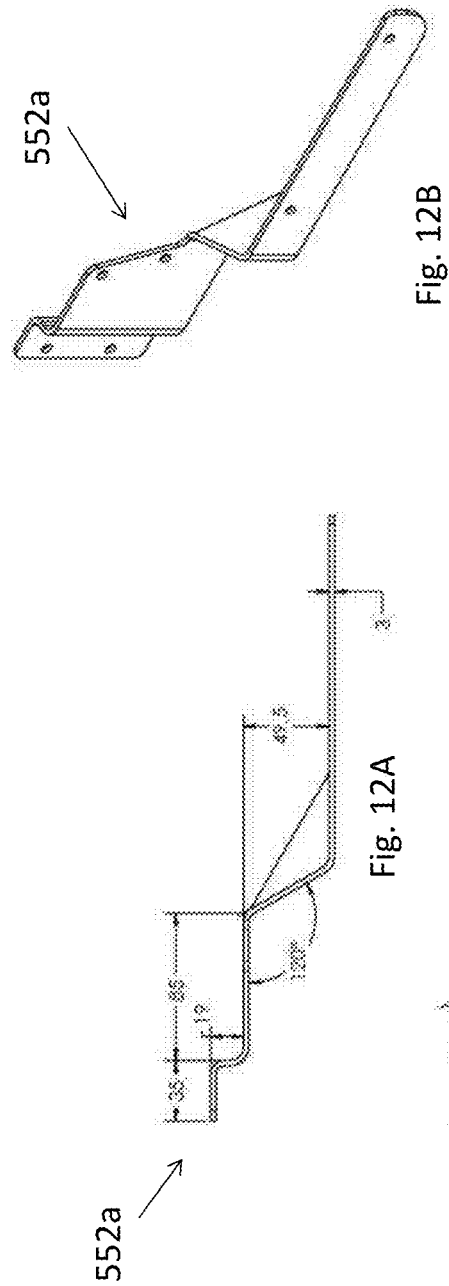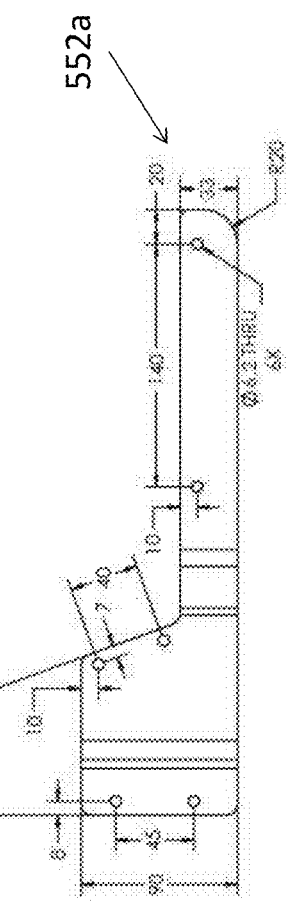
Fig. 12A
Fig. 12B
Fig. 12C

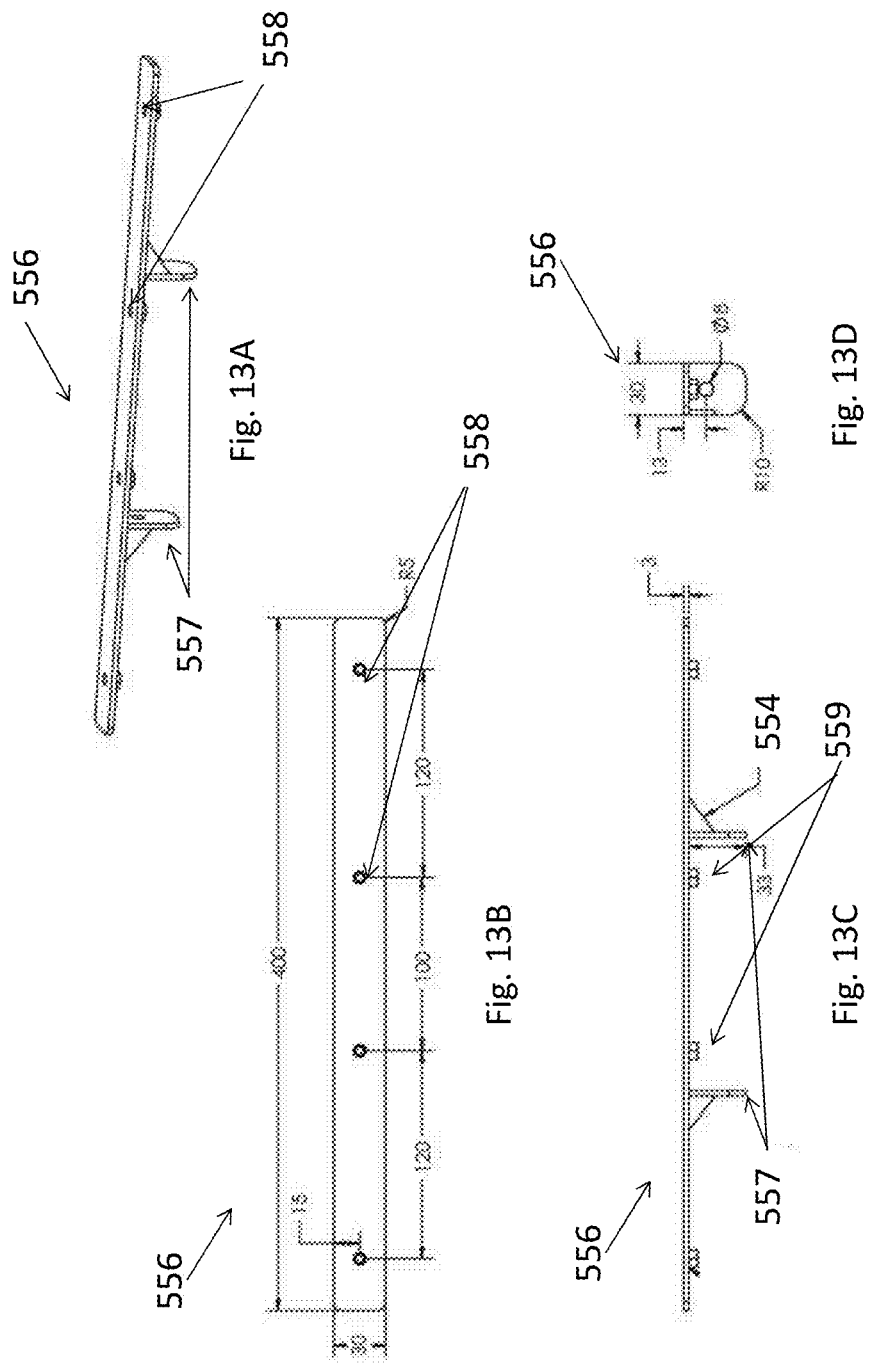

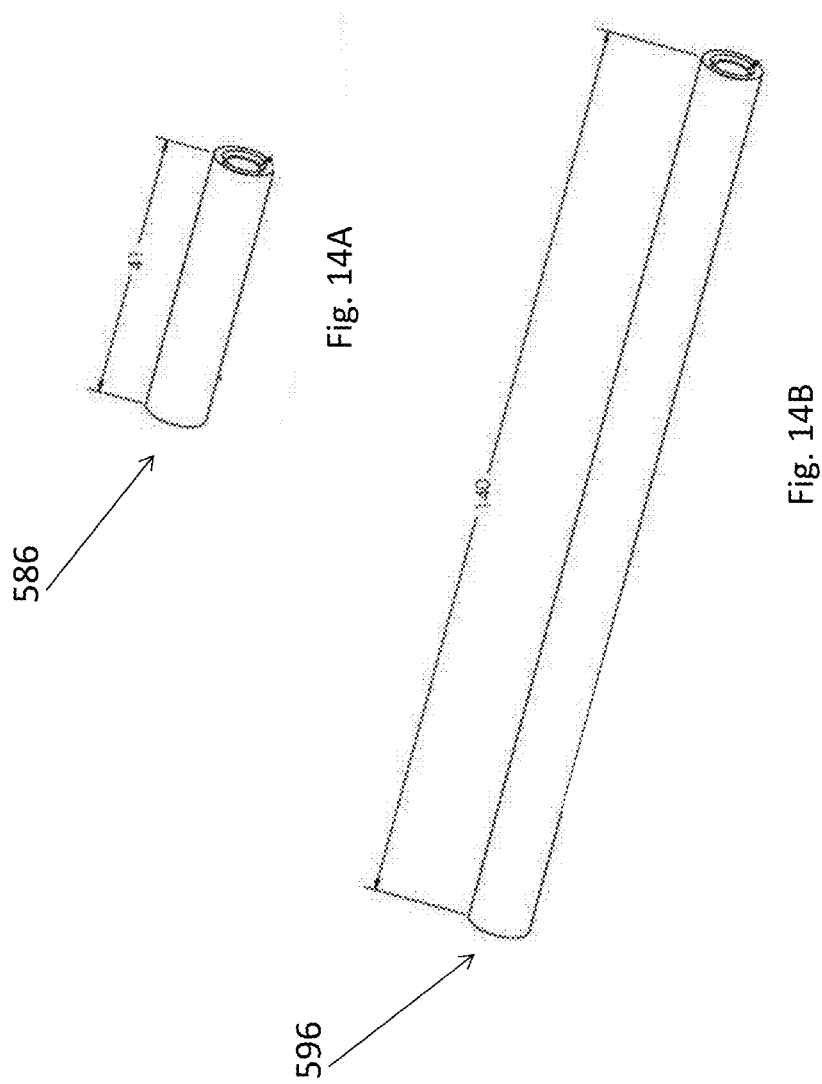

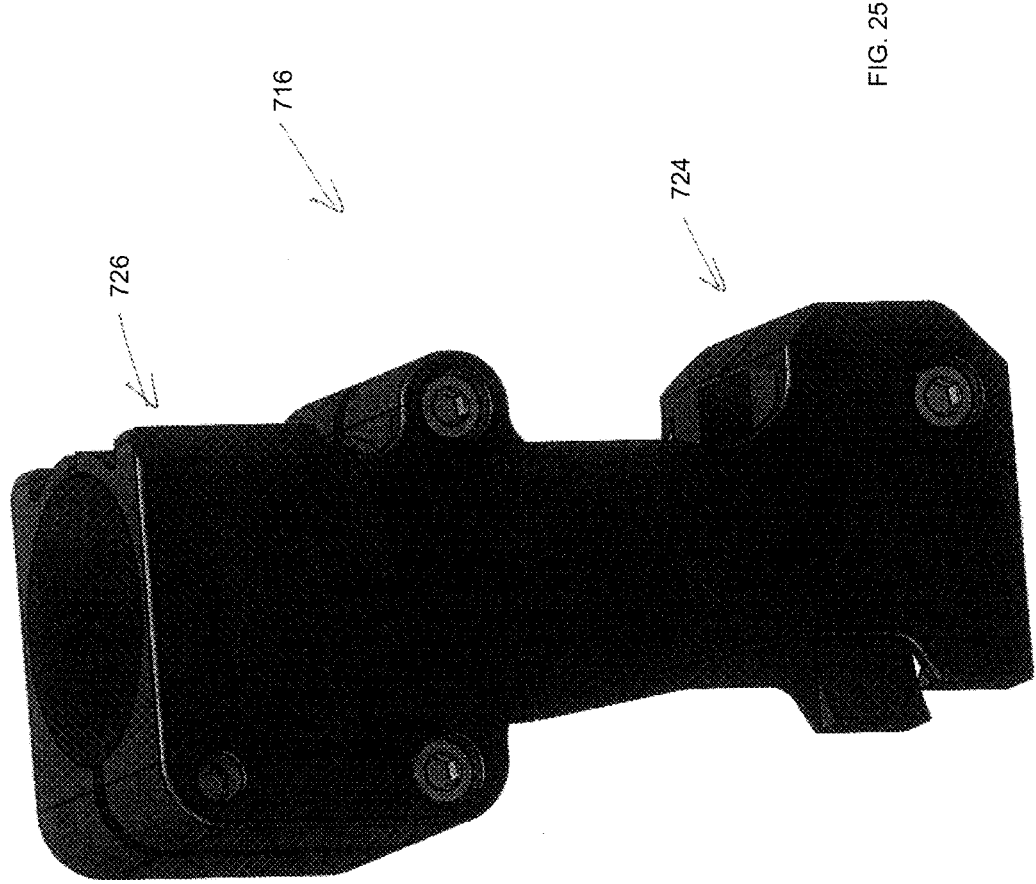

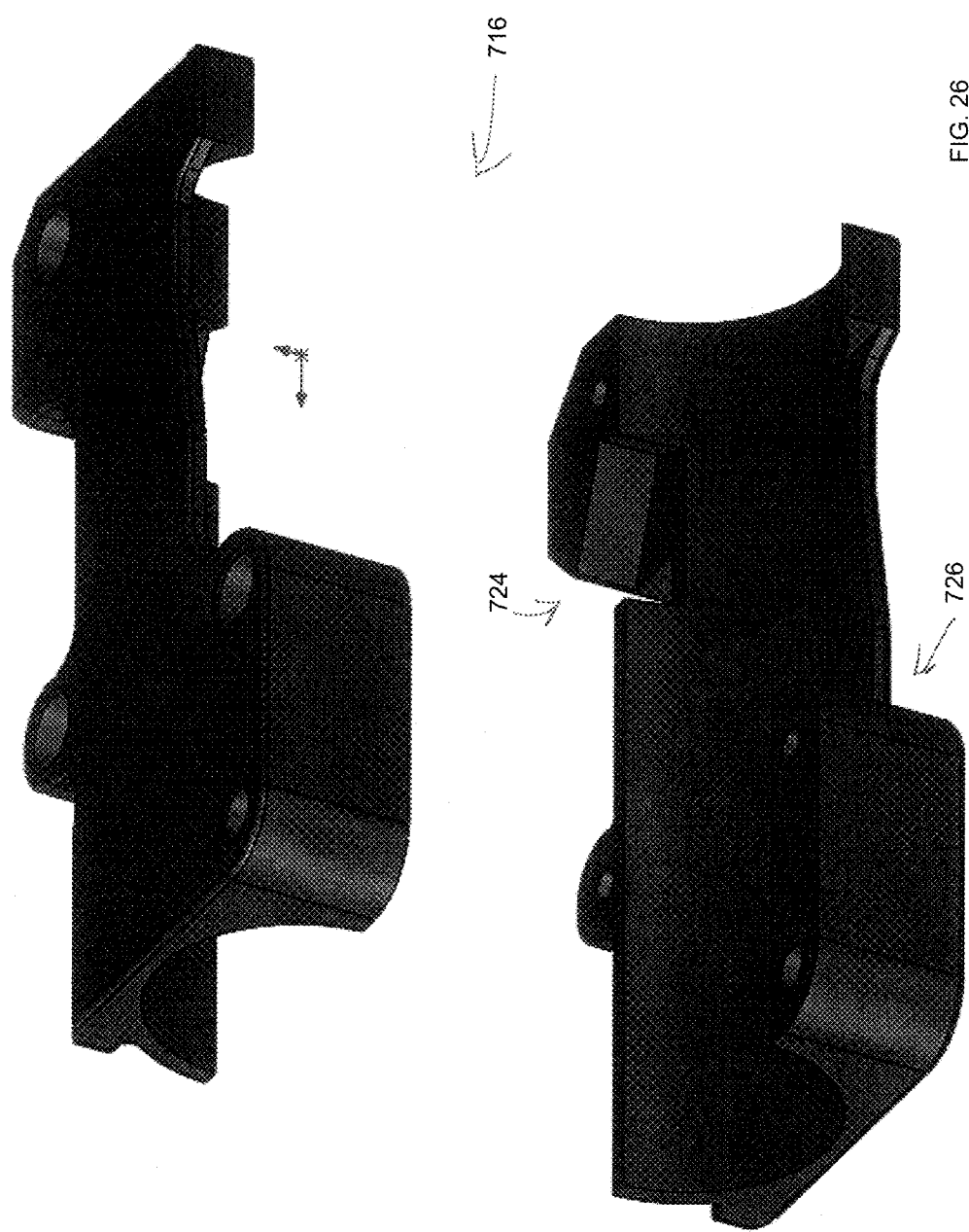

BICYCLE WITH ATTACHMENTS

INCORPORATION BY REFERENCE TO ANY PRIORITY APPLICATIONS

Any and all applications for which a foreign or domestic priority claim is identified in the Application Data Sheet as filed with the present application are hereby incorporated by reference and made a part of the present disclosure.

BACKGROUND

Field

The present disclosure relates generally to bicycles. In particular, the present disclosure relates to a bicycle having one or more integrated cup holders, one or more integrated front racks, and/or one or more integrated front baskets.

Description of Related Art

Many types of bicycle designs exist. Some such bicycles include a cup holder. However, conventional cup holder designs typically are coupled to a handlebar of the bicycle and/or suffer from many drawbacks, including being overly complicated, heavy, expensive, and difficult to assemble or adjust. Similarly, some such bicycles include a front cargo holder such as a front rack and/or a front basket but conventional designs typically are coupled to a handlebar of the bicycle and suffer from drawbacks. For example, when the bicycle park on street, the handle bar and wheels will always turn around lying toward the side of kickstand, making the bicycle unbalanced.

SUMMARY

Accordingly, a need exists for improved bicycle attachment designs and arrangements, which, in some embodiments, overcome one or more of the drawbacks of the prior art or at least provide the public with a useful choice. The systems, methods and devices described herein have innovative aspects, no single one of which is indispensable or solely responsible for their desirable attributes. Without limiting the scope of the claims, some of the advantageous features will now be summarized.

A preferred embodiment involves a bicycle comprising a front wheel, a rear wheel and a frame supporting the front wheel and the rear wheel. The frame also includes a bottom bracket defining an axis. A pedal crank assembly is supported for rotation about the axis and includes a drive gear. A driven gear is rotationally coupled to the rear wheel. The drive gear is coupled to the driven gear by a suitable drive member or arrangement. The frame also includes a vertical plate having one or more through-holes. The vertical plate comprises a mounting surface adjacent to or surrounding the one or more through-holes. The mounting surface receives a mounting portion of an attachment structure (e.g. cup holder, or cargo carrier) and a fastener passes through the through-hole to secure the cup holder to the vertical plate.

In some configurations, a cup holder is provided on each side of the vertical plate.

In some configurations, the vertical plate comprises a single through-hole.

In some configurations, the vertical plate comprises a pair of through-holes.

In some configurations, the cup holder comprises the mounting portion, an upper ring, a lower ring, an upper horizontal support which connects the upper ring to the mounting portion, a lower horizontal support which connects the lower ring to the mounting portion, and a base which at least partially extends across the lower end of the lower horizontal support.

In some configurations, the attachment structure is a front cargo carrier, wherein the cargo carrier comprises a pair of bases each having the mounting portion and extending to the front side of the bicycle from the mounting portion.

In some configurations, the front cargo carrier further comprises a rack shelf mounted on the pair of bases, wherein the shelf is configured to hold cargo thereon.

In some configurations, the rack shelf comprises a plurality of bars.

In some configurations, the front cargo carrier further comprises a mount support structure mounted on the pair of bases, wherein the mount support structure comprises a mechanism configured to reversibly hold another structure thereon.

In some configurations, the mount support structure comprises an elongated rectangular shaped bar.

In some configurations, the front cargo carrier further comprises a basket mounted on the pair of bases, wherein the basket is configured to hold cargo therein.

In some configurations, the basket is reversibly foldable and is configured to have a planar shape when the basket is completely folded.

In some configurations, the basket comprises a bottom panel, a front panel, a back panel and two side walls, wherein each side wall comprises a side center panel and two side corner panels, wherein the basket comprises at least one hinge connecting two of the bottom, front, back, side center and side corner panels.

A preferred embodiment involves a bicycle comprising a front wheel, a rear wheel and a frame supporting the front wheel and the rear wheel. The frame also includes a bottom bracket defining an axis. A front cargo carrier includes a pair of bases each having the mounting portion and extending to the front side of the bicycle from the mounting portion. The frame includes a vertical plate having one or more through-holes. The vertical plate comprises a mounting surface adjacent to or surrounding the one or more through-holes. The mounting surface receives the mounting portion of each of the pair of bases of the front cargo carrier. One or more fasteners each passes through one of the one or more through-holes to secure the pair of bases of front cargo carrier to the vertical plate.

In some configurations, the front cargo carrier further comprises a mount support structure mounted on the pair of bases, wherein the mount support structure comprises one or more through-holes from a top surface to a bottom surfaces.

In some configurations, the front cargo carrier further comprises a basket reversibly mounted on the top surface of the mount support structure, wherein the basket is configured to hold cargo therein.

In some configurations, the basket comprises the bottom surface having through-holes, the through-holes configured to be aligned with the through-holes of the mount support structure and receive fasteners to fix the basket on the mount support structure.

In some configurations, the basket is reversibly foldable and is configured to have a planar shape when the basket is completely folded.

A preferred embodiment involves a bicycle comprising a front wheel, a rear wheel and a frame supporting the front wheel and the rear wheel. The frame also includes a bottom bracket defining an axis. A pedal crank assembly is supported for rotation about the axis and includes a drive gear. A driven gear is rotationally coupled to the rear wheel. The drive gear is coupled to the driven gear by a suitable drive member or arrangement. A basket has an attachment portion and is removably coupled to the frame. The frame comprises a bracket having a support portion that supports the attachment portion of the basket and a retention portion that is configured to inhibit movement of the basket in a fore-and-aft direction.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

FIG. 11 is an exploded view of a perspective view of the front rack of FIGS. 10A-D.

FIGS. 12A, 12B and 12C are top, perspective and side views of a right-side base of the front rack of FIGS. 10A-D, respectively.

FIGS. 13A, 13B, 13C and 13D are perspective, top, front and side views of a crossbar of the front rack of FIGS. 10A-D, respectively.

FIG. 14A is a perspective view of a minor support bar of the front rack of FIGS. 10A-D.

FIG. 14B is a perspective view of a major support bar of the front rack of FIGS. 10A-D.

FIG. 25 is a perspective view of the mount of FIG. 22 shown separate from the bicycle.

FIG. 26 is a perspective view of the mount of FIG. 22 shown separate from the bicycle and with the two halves of the mount separated.

DETAILED DESCRIPTION

Figure 1:
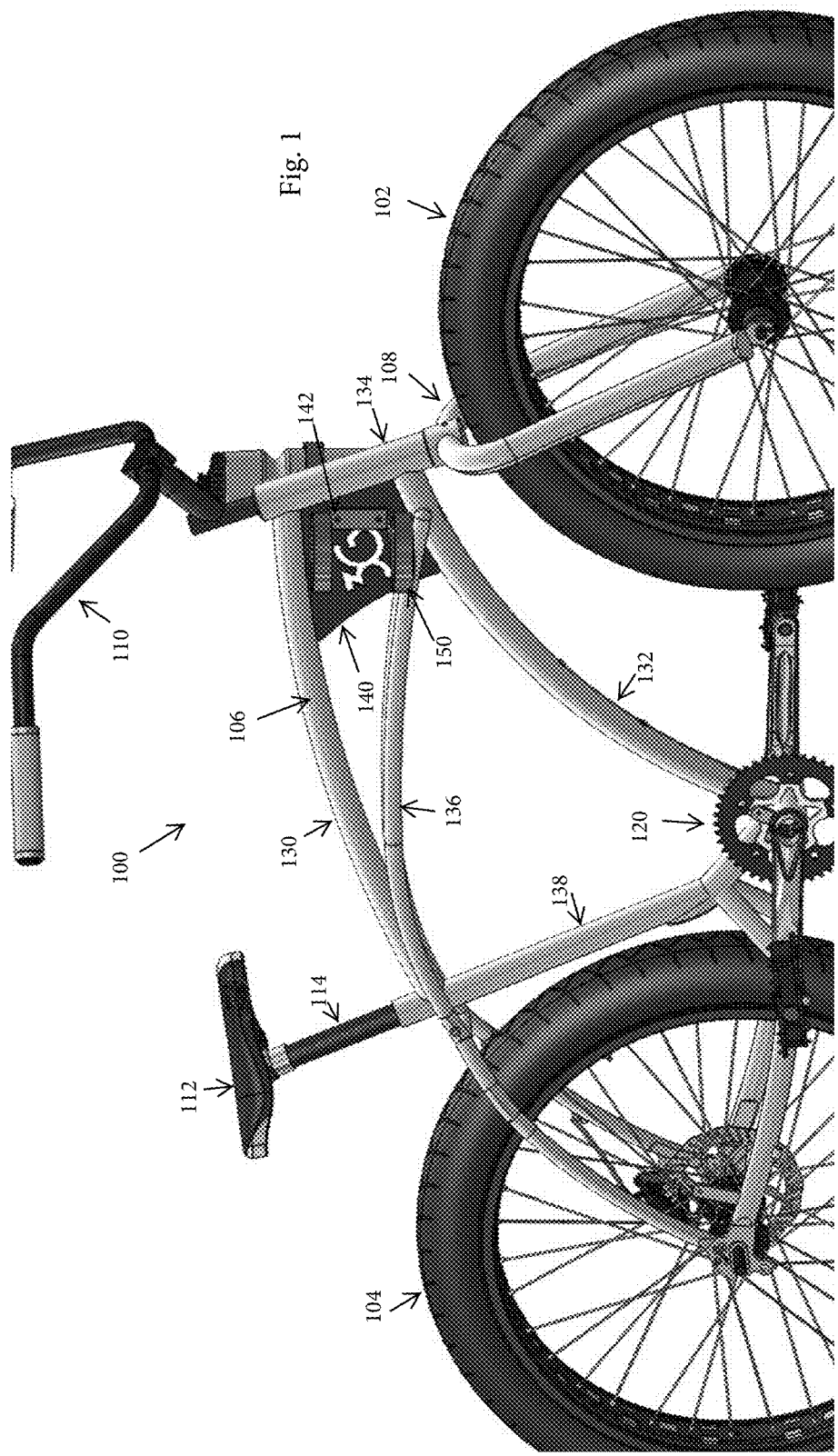
FIG. 1 is a perspective view of a bicycle including a pair of cup holders.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Cup Holder of FIGS. 1-4

Figure 2:
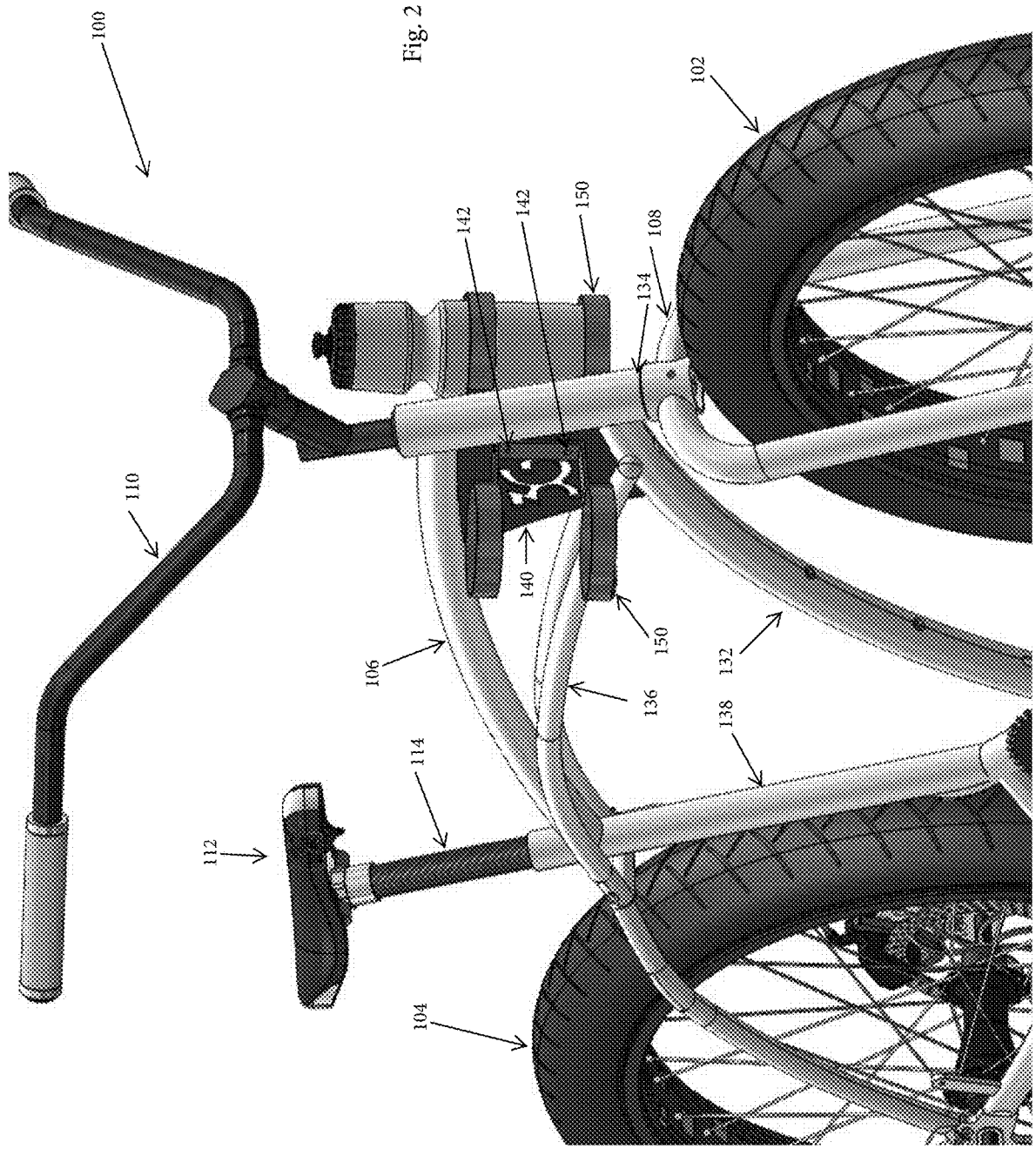
FIG. 2 is a perspective view of a portion of the bicycle and cup holders shown in FIG. 1.

With reference to FIGS. 1 and 2, a bicycle 100 includes a front wheel 102, a rear wheel 104 and a frame 106 supported by the front wheel 102 and the rear wheel 104. The front wheel 102 is rotatably supported relative to the frame 106 by a front fork 108 for rotation about a steering axis. A handlebar 110 is coupled to the front fork 108, via a suitable handlebar stem or clamp, and allows a user to steer the front wheel 102. The stem or clamp can be height-adjustable, as is known in the art. Typically, rotational adjustment of the handlebar 110 is permitted about a lateral axis. The frame 106 supports a bicycle seat or saddle 112, such as via a height adjustable seat post 114. The bicycle 100 preferably includes a pedal crank assembly 120 that is coupled via a transmission arrangement (e.g., a chain or belt drive) to the rear wheel 104 such that rotation of the pedal crank assembly 120 in at least one direction causes rotation of the rear wheel 104.

The illustrated frame 106 includes several frame tubes, such as a top tube 130, a down tube 132 and a head tube 134, possibly among others. The frame 106 can be of a double triangle design having a front triangle that supports the front fork 108 (and, thus, the front wheel 102) and a rear triangle that supports the rear wheel 104. In the illustrated arrangement, the frame 106 includes seat stays 136 that extend forward of a seat tube 138 on opposing sides of the top tube 130 and terminate at a forward end of the down tube 132. However, the frame 106 can be of any suitable arrangement.

The frame 106 also includes a vertical plate 140. In the illustrated arrangement, the vertical plate 140 is located at a junction between the top tube 130, the down tube 132 and the head tube 134. In some configurations, the vertical plate 140 is positioned vertically between the top tube 130 and the down tube 132 and contacts each of the top tube 130, the down tube 132 and the head tube 134. The vertical plate 140 can reinforce one or more of the top tube 130, the down tube 132 and the head tube 134. A fourth side of the vertical plate 140 can be exposed and not connected to any tube of the frame 106. In some configurations, the frame 106 is a metal (e.g., aluminum or steel) and the vertical plate 140 is welded to the tubes 130, 132, 134. The vertical plate 140 can include a logo cut-out.

The vertical plate 140 can include at least one mounting surface for mounting of a cup holder 150. In the illustrated arrangement, each side of the vertical plate 140 includes a mounting surface that receives a cup holder 150. Thus, in the illustrated arrangement, the bicycle 100 includes a pair of cup holders 150, which one cup holder 150 on each side of the bicycle 100. The vertical plate 140 can include one or more through-holes through which a fastener 142 passes to secure the cup holder(s) 150 to the vertical plate 140. In the illustrated arrangement, two fasteners 142 secure the cup holders 150 to the vertical plate 140. However, in other arrangements, a single fastener 142 may be used, which can make manufacturing easier by eliminating the need to properly space and align two through-holes. In such arrangements, another anti-rotation mechanism can be utilized to inhibit or prevent undesired rotational movement of the cup holder(s) 150. In some configurations, the fastener 142 is a double threaded fastener such that it can couple the cup holders 150 on each side of the vertical plate 140.

Figure 3:
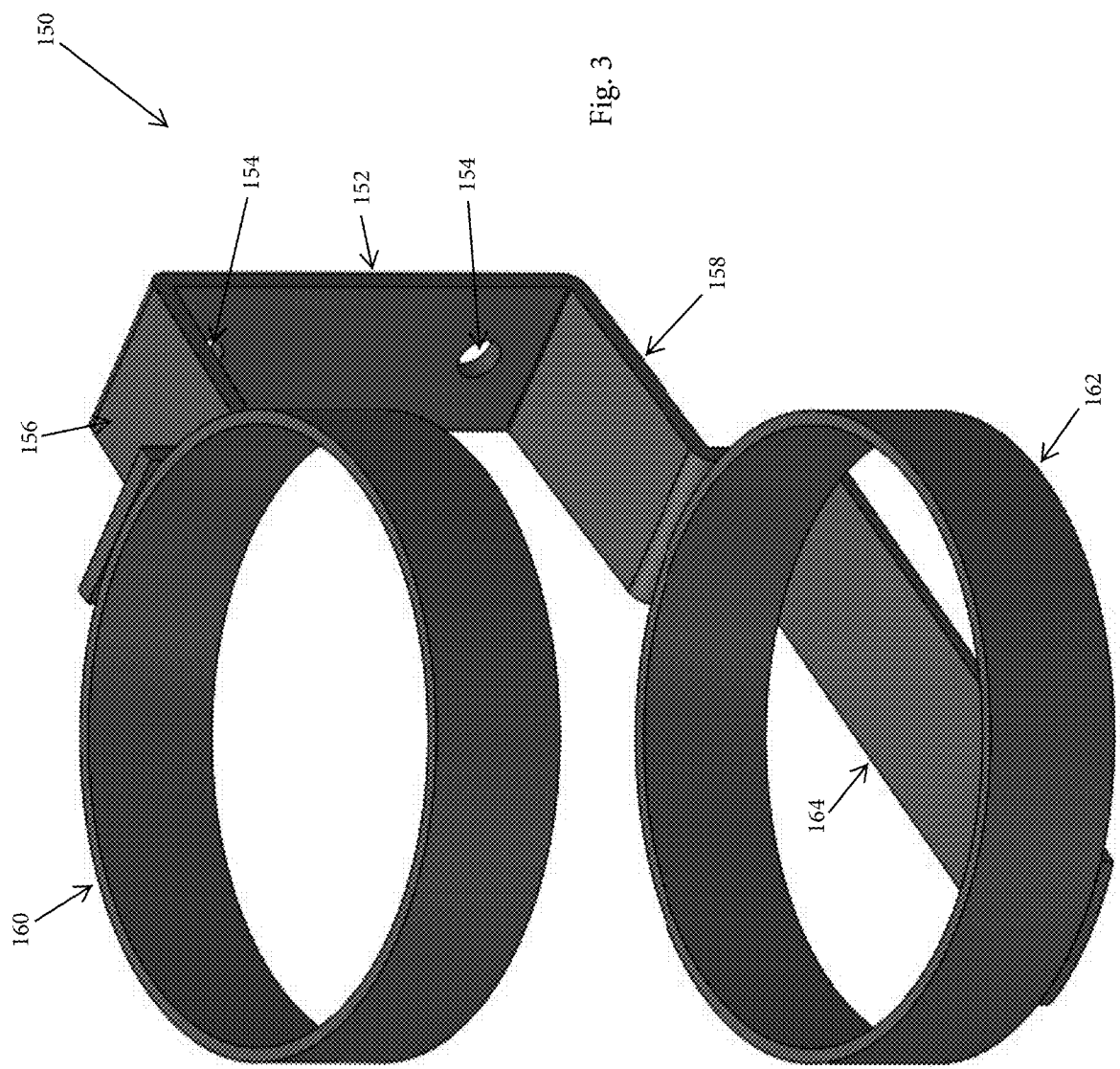
FIG. 3 is a perspective view of one of the cup holders of FIG. 1 separate from the bicycle. The other cup holder can be identical and can be oriented in a mirror image fashion relative to a central plane of the bicycle.
Figure 4:
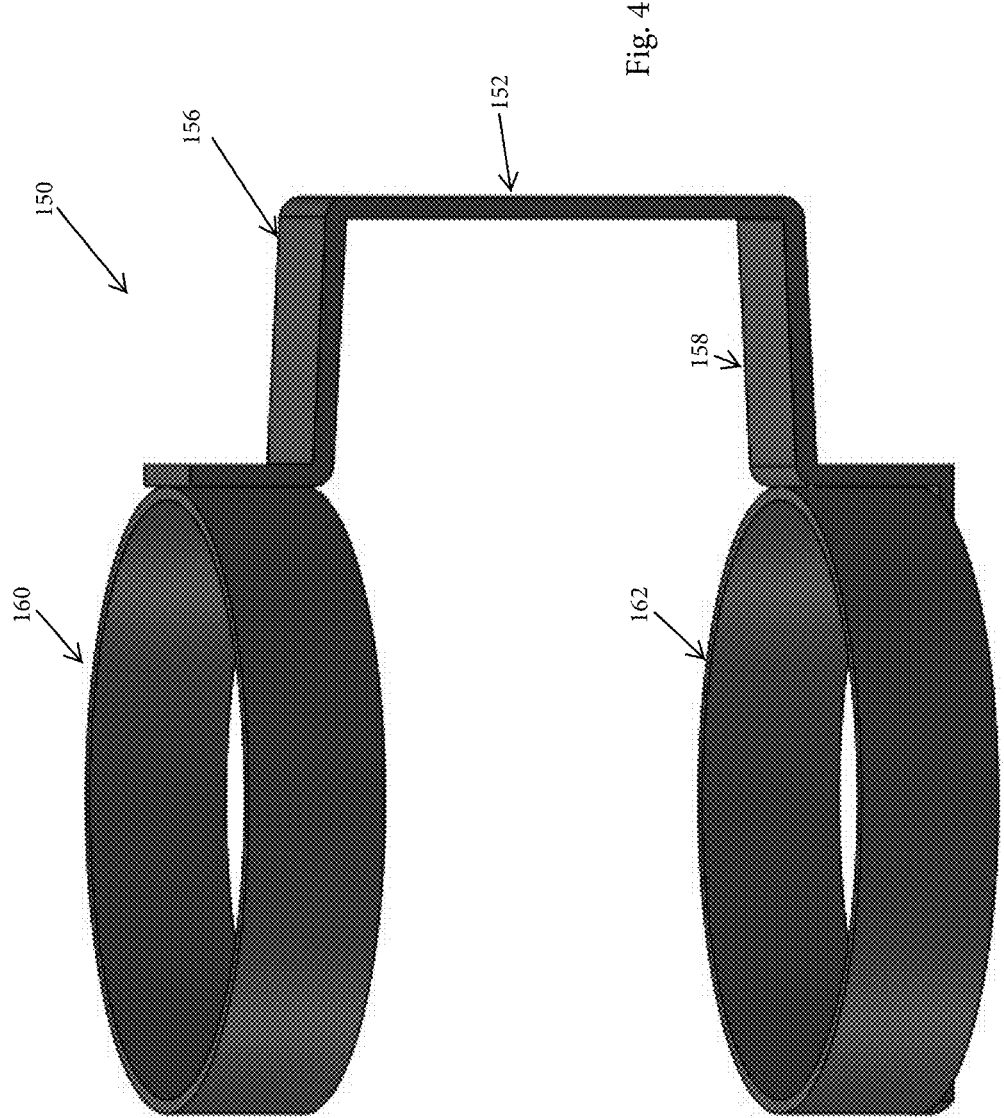
FIG. 4 is a side perspective view of the cup holder of FIG. 3.

The cup holder 150 can be configured to hold any desired type of cup or beverage container. In the illustrated arrangement, the cup holder 150 can accept a standard size bicycle water bottle. However, other sizes can also be provided or the cup holder 150 can be adjustable, if desired. With reference to FIGS. 3 and 4, in some configurations, the cup holder 150 can include a mounting portion 152 that is vertically-oriented and defines one or more through-holes 154 configured to align with the through-hole(s) of the vertical plate 140 and accept the fastener(s) 142. The cup holder 150 also includes an upper horizontal support 156 and a lower horizontal support 158 that connect an upper ring or loop 160 and a lower ring or loop 162, respectively, to the mounting portion 152. The cup holder 150 can also include a base 164 that extends partially or completely across the lower end of the lower horizontal support 158 to provide a stop or rest for a cup or other container placed within the cup holder 150 to the extent that the upper or lower rings 160, 162 do not support the cup or other container at a location above the base 164. The rings 160, 162 can be sized, shaped or otherwise configured to accept a desired size or size range of cups, bottles or other containers. In the illustrated configuration, the mounting portion 152, the upper horizontal support 156, the lower horizontal support 158 and the base 164 are formed by a single bent piece of material. However, other configurations are also possible.

Front Rack and Basket of FIGS. 5-12

Figure 5:
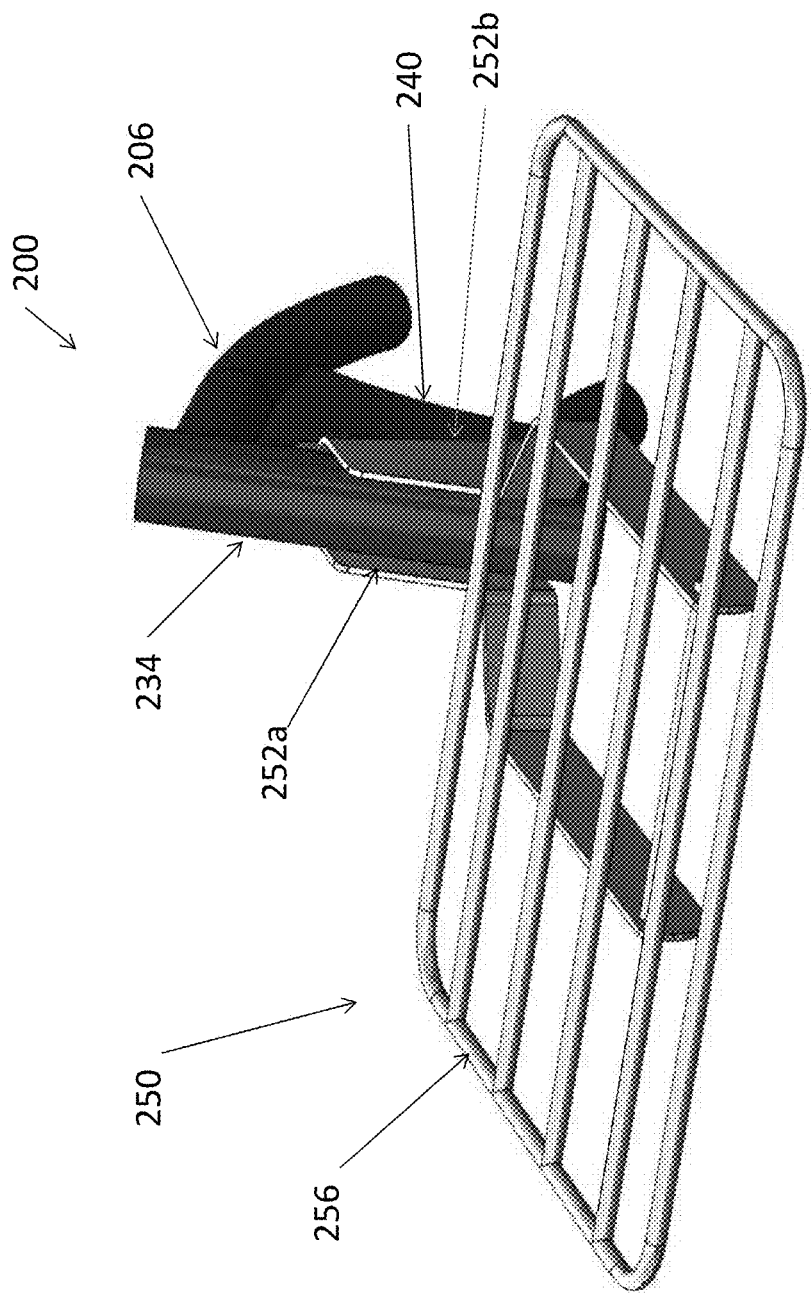
FIG. 5 is a perspective view of a portion of the bicycle including a front rack.
Figure 6:
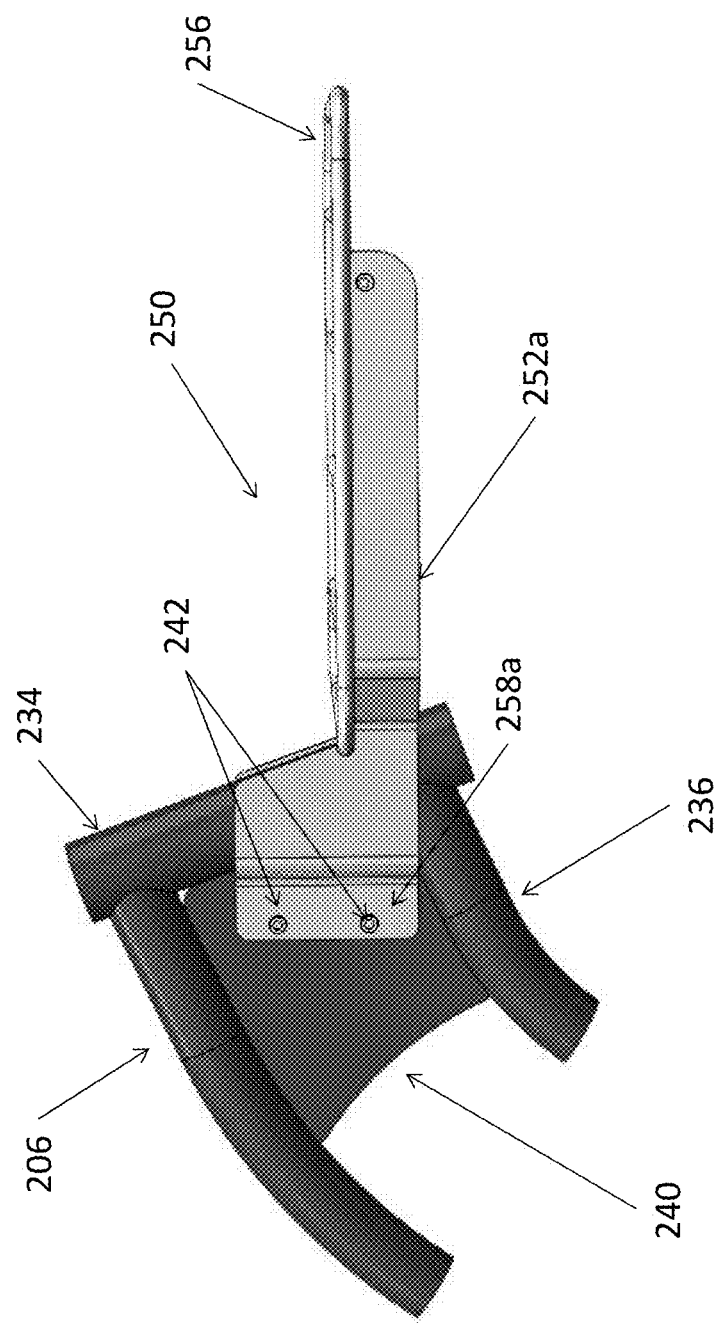
FIG. 6 is a side view of the portion of the bicycle and the front rack shown in FIG. 5.

Bicycles may include a front cargo holder coupled to their frame. FIGS. 5-6 illustrates a portion of a bicycle 200 similar with the bicycle 100 described in relation to FIGS. 1-2. The bicycle 200 includes a top tube 230, a down tube 232, a head tube 234, and a vertical plate 240 located at a junction between the top tube 230, the down tube 232, and the head tube 234. Each of the bicycle 200, the top tube 230, the down tube 232, the head tune 234, and the vertical plate 240 is constructed similar to the bicycle 100, the top tube 130, the down tube 132, the head tube 134 and the vertical plate 140 shown in FIGS. 1-2 and described elsewhere in the specification, respectively. However, here, the bicycle 200 includes a front rack 250 mounted on the vertical plate 240, instead of the cup holder of FIGS. 1-4.

The front rack 250 includes a pair of bases 252a and 252b extending to the front side of the bicycle 200, and a rack shelf 256 disposed on the bases 252a and 252b. Like the vertical plate 140 of FIGS. 1-2, the vertical plate 240 of FIGS. 5-6 include one or more through-holes through which a fastener 242 passes to secure the bases 252a and 252b of the front rack 250 to the vertical plate 240. In some configurations, on their rear-most end, the bases 252a and 252b can include mounting portions 258a (FIG. 6) and 258b (not shown) respectively, each of which is vertically-oriented and defines one or more through-holes configured to align with the through-hole(s) of the vertical plate 240 and accept the fastener(s) 242. The illustrated bases 252a and 252b each include three offset portions, which can be planar or substantially planar. The portions are displaced successively further from a centerline of the bicycle 200 in a direction from rearward to forward. The portions that support the rack shelf 256 have a height that is smaller than a height of one or both of the other portions. The middle portion can have an angled edge, which angle can be the same as or similar to an angle of the head tube 234 of the bicycle 200, as shown in FIG. 6, for example.

In the illustrated arrangement, two fasteners 242 secure the bases 252a and 252b to the vertical plate 240. However, in other arrangements, a single fastener 242 may be used, which can make manufacturing easier by eliminating the need to properly space and align two through-holes. In such arrangements, another anti-rotation mechanism can be utilized to inhibit or prevent undesired rotational movement of the front rack 250. In some configurations, the fastener 242 is a double threaded fastener such that it can couple each of bases 252a and 252b of the rack 250 on each side of the vertical plate 240.

The rack shelf 256 of the front rack 250 may be welded to the bases 252a and 252b such that the components of the front rack 250 can be held together as a one piece. However, in some arrangements, the shelf 256 may be attached to the bases 252a and 252b with adhesives or any other suitable means. In some arrangements, the shelf 256 may be detachably attached to the bases 252a and 252b (e.g. by hooks or clips), such that the front rack 250 can be reversibly disassembled and removed from the bicycle 200 by the user of the bicycle.

The illustrated rack shelf 256 has a rectangular planar shape overall, and constructed from multiple bars. However the rack shelf can have different shape and sizes to accommodate to various uses of the bicycle. For example, in some arrangements, the shelf 256 may be a continuous plate rather than a set of bars, such that it can hold smaller items which may fall between the bars of the illustrated rack shelf 256. In some arrangements, the rack shelf 256 may additionally include mechanisms to receive and secure additional structures on it, such as baskets. In other arrangements, the illustrated rack shelf 256 may be substituted with other structures, such as a basket or a box mounted on bases 252a and 252b directly or with a support mount support structure (s), wherein the basket or box includes sidewalls enclosing a volume or space to hold items. Thus, references to one of a rack, a box and a basket herein could be replaced with any other of a rack, a box and a basket.

Figure 7:
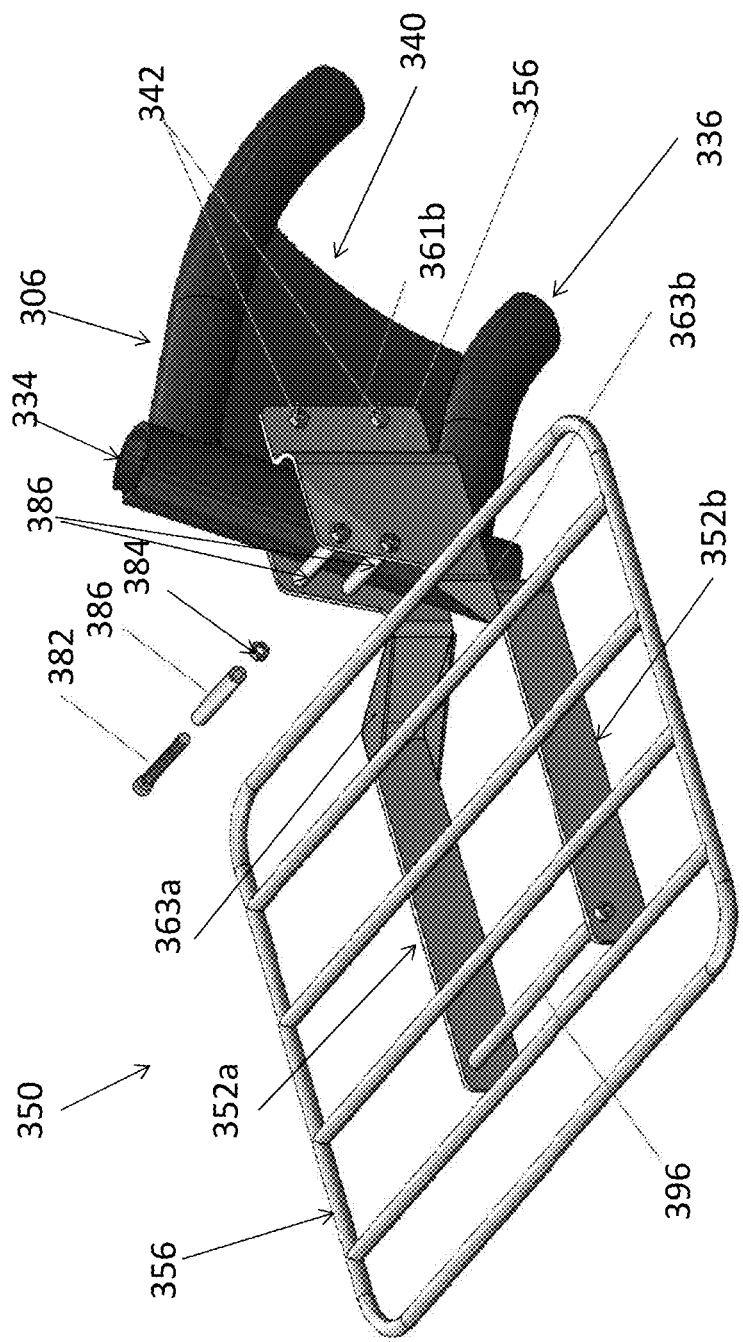
FIG. 7 is a schematic exploded view of a portion of the bicycle including a front rack similar to FIG. 5.
Figure 8C:
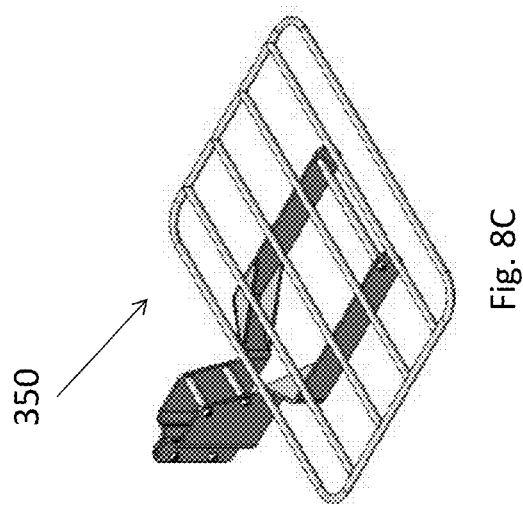
FIGS. 8A, 8B and 8C are top, side and perspective views of the front rack of FIG. 7, respectively.
Figure 8A:
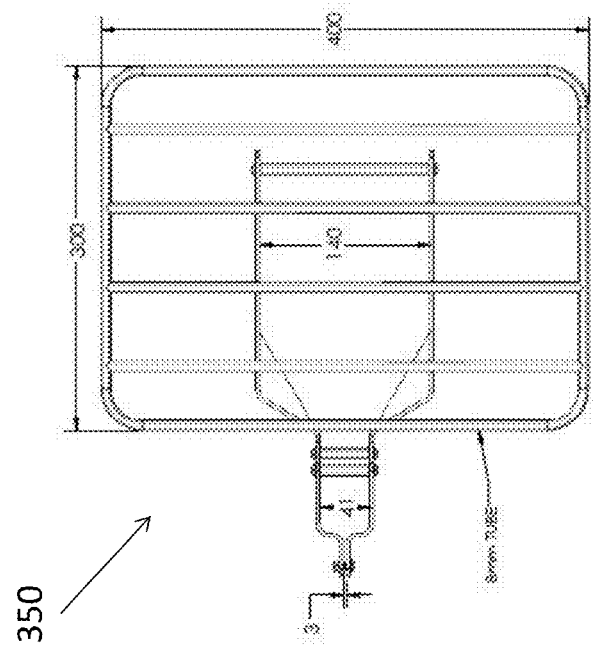
Figure 8B:
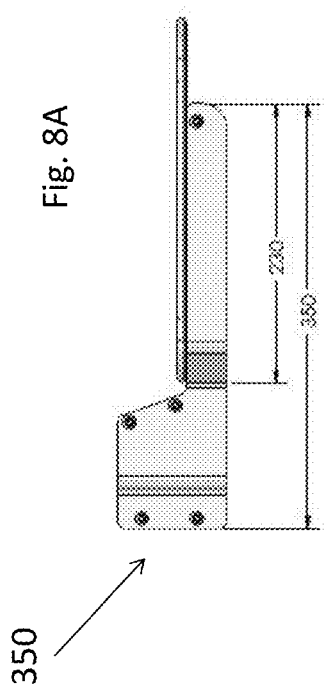

FIG. 7 illustrates a portion of a bicycle 300 similar with bicycles described in relation with FIGS. 1-2 and 5-6, including a top tube 330, a down tube 332, a head tube 334, and a vertical plate 340. The bicycle 300 also includes a front rack 350 similar with the front rack described in relation with FIGS. 5-6, including a right-side base 352a, a left-side base 352b, a rack shelf 356, and a fastener 342. However, here, the illustrated front rack 350 additionally includes two minor support bars 386 and a major support bar 396 disposed between the bases 352a and 352b. Further, the illustrated pair of bases 352a and 352b additionally includes extended portions 361a (not shown) and 361b, respectively, with holes to fix minor support bars 386, and corner supports 363a and 363b, respectively, for reinforcement. In some arrangements, the front rack 350 may include more or fewer number of major/minor support bars than the illustrated front rack 350 of FIG. 7. Minor support bars 386 may be fixed on bases 352a and 352b with a bolt 382 passing through the holes in the extended portions 361a and 361b, and the inner cavity of bars 386 and a nut 384, as shown in the exploded view of the bolt 382, nut 384 and minor support bar 386 contained within FIG. 7. The major support bar 396 may be fixed between bases 352a and 352b in similar manner. FIGS. 8A, 8B and 8C illustrate the top, side, and perspective views of the front rack 350, respectively. FIGS. 8A and 8B also illustrate dimensions (in mm) of one configuration of the front rack 350 according to the description in this section or elsewhere in the specification. In other configurations, the front rack 350 may have different sizes and/or proportions to accommodate to various uses.

Figure 9:
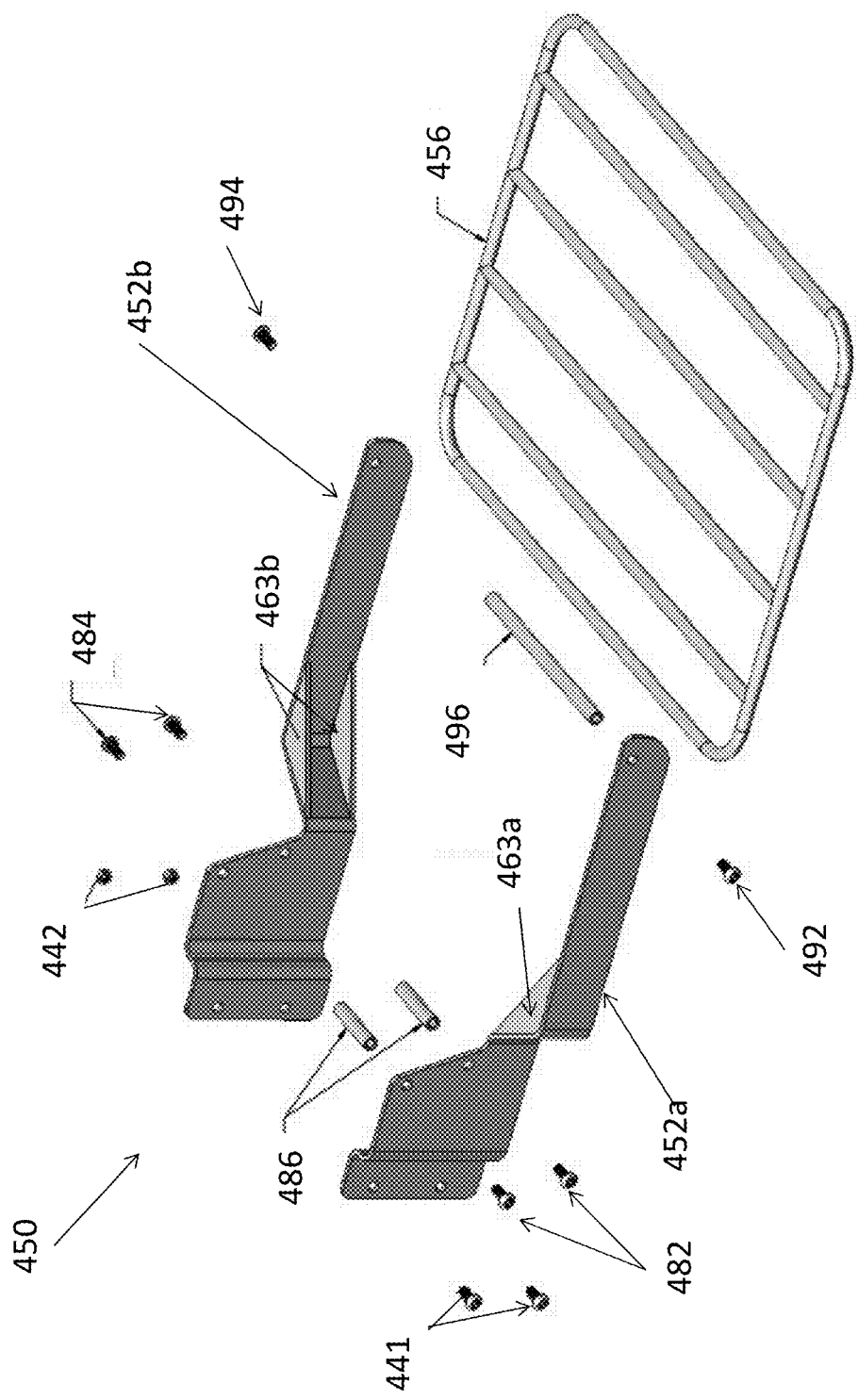
FIG. 9 is an exploded view of a perspective view of a front rack.

Major and minor support bars may be fixed between bases of the front rack by various mechanisms. FIG. 9 illustrate an example of such a different arrangement of a front rack 450 which is similar with the front rack 350 described in relation to FIGS. 7-8C. Each of components of the rack 450, for example, bases 452a and 452b, the rack shelf 456, the major support bar 496, and minor support bars 486 are constructed similar to the corresponding parts of the front rack 350 shown in FIGS. 7-8C, except as noted below. In the illustrated arrangement of FIG. 9, minor support bars 486 may be fixed between bases 452a and 452b with bolts 482 at both ends passing through holes on bases 452a and 452b and the cavity within bars 486. The inner cavity of bars 486 may be threaded at both ends to receive bolts 482. Similarly, the major support bar 496 may be fixed with bolts 492 at both ends passing through holes on bases 452a and 452b, and the inner cavity of the bar 496 may be threaded at both ends to receive bolts 492. In some arrangements, the bolts 482 and 492 may be same in size and shape such that they are interchangeable.

Figure 10A:
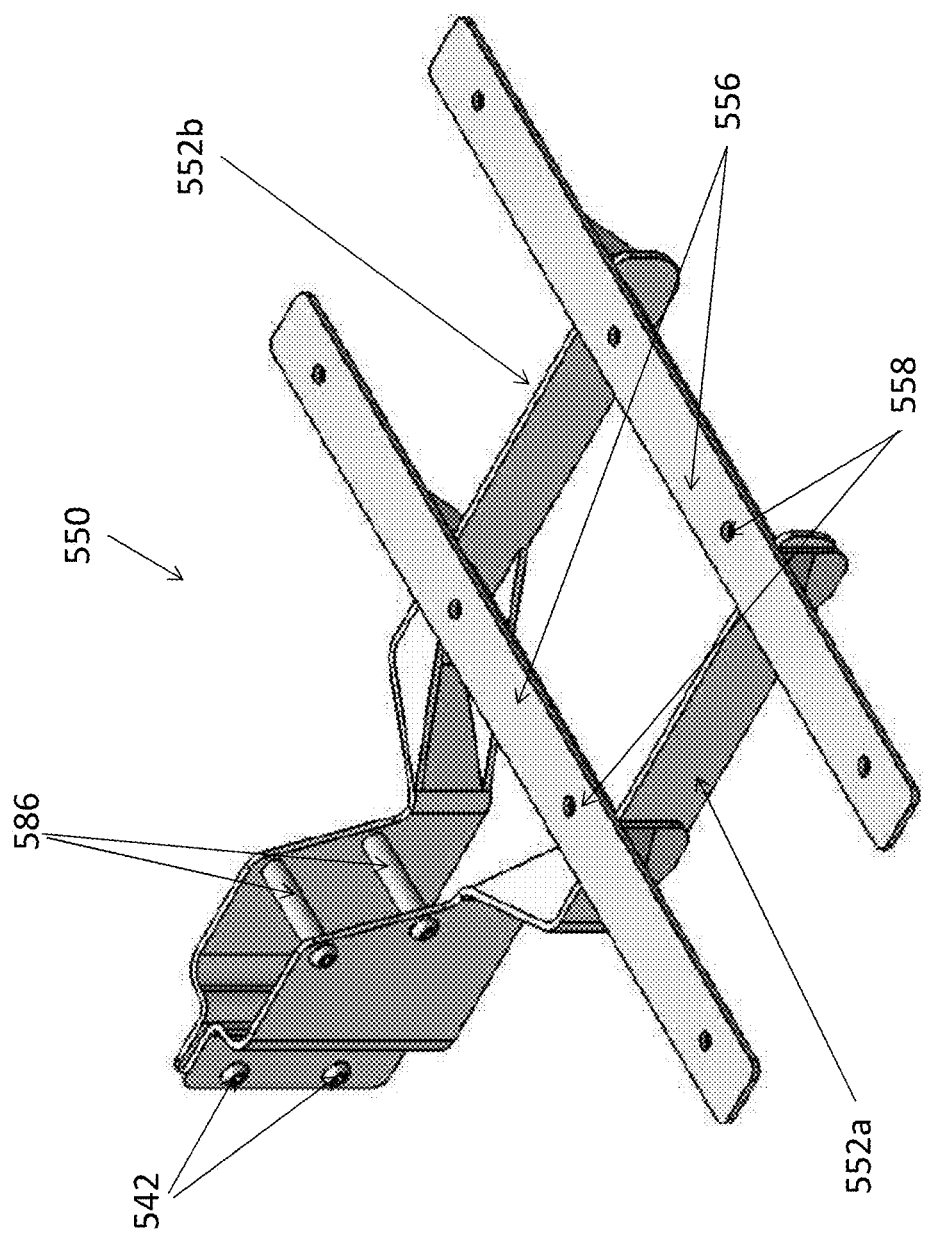
FIGS. 10A and 10B are perspective views of a front rack.
Figure 10B:
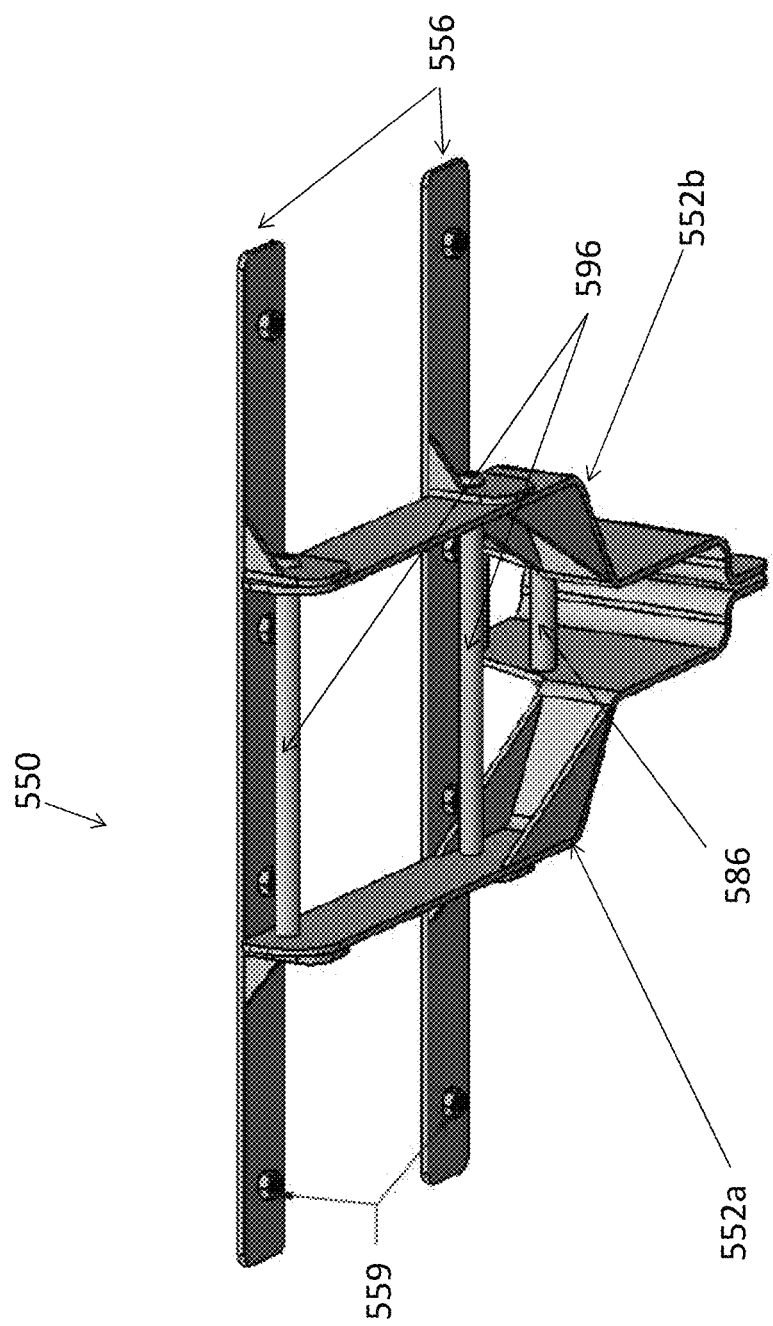

As described elsewhere in the specification, rack shelves described in relation with FIGS. 5-9 may be replaced with other structures, such as a box or a basket mounted on bases directly or with an additional mount support structure(s). FIGS. 10A-D illustrate an example of such a front rack having mount support structures supporting structures, a front rack 550. FIGS. 10A-B illustrate perspective views of the front rack 550 from top-right-front and bottom-left-front, respectively. The front rack 550 and each of components of the rack 550, for example, a right-side base 552a, a left-side base 552b, fasteners 542, major support bars 596 (FIG. 10B) and minor support bars 586 are constructed similar to the corresponding parts of the front rack 350 or 450 shown in FIGS. 7-9C, except as noted below.

Figure 10C:
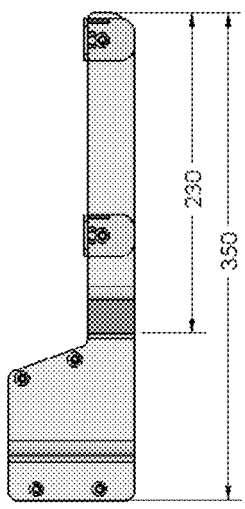
FIGS. 10C and 10D are side and top views of the front rack of FIGS. 10A-B, respectively.
Figure 10D:
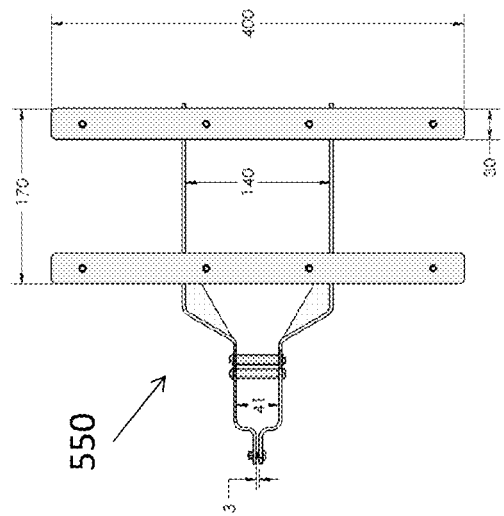

The front rack 550 may include a mount support structure mounted on bases 552a and 552b, instead of rack shelves 356 or 456 of FIGS. 5-9. In the illustrated arrangement, the mount support structure is a set of two crossbars 556 each mounted on bases 552a and 552b, extending parallel to each other and perpendicular to the bases. However, mount support structures may be in different form, or include different numbers of crossbars to accommodate to various structures to be mounted on it. For example, the mount support structure may include one, three, four or more crossbars 556. The illustrated crossbars 556 includes plurality of holes 558 (FIG. 10A) and nuts 559 on the bottom surface of crossbars 556 at each hole 558. Nuts 559 may be welded to the bottom surface of crossbars 556. The illustrated front rack 550 also includes two major support bars 596 located under crossbars 556 as shown in FIG. 10B. FIGS. 10C and 10D illustrate the side and top views of the front rack 550, respectively. FIGS. 10C and 10D illustrate dimensions (in mm) of one configuration of the front rack 550 according to the description in this section or elsewhere in the specification. In other configurations, the front rack 550 may have different sizes and/or proportions to accommodate to various uses.

FIG. 11 illustrates an exploded view of the front rack 550. In the illustrated arrangement of FIG. 11, minor support bars 586 may be fixed between bases 552a and 552b with bolts 582 at both ends passing through holes on bases 552a and 552b and the cavity within bars 586. The inner cavity of bars 586 may be threaded at both ends to receive bolts 582. Similarly, major support bars 596 may be fixed with bolts 592 at both ends passing through holes on bases 552a and 552b, and the inner cavity of the bar 596 may be threaded at both ends to receive bolts 592. In some arrangements, the bolts 582 and 592 may be same in size and shape such that they are interchangeable. In other arrangements, major support bars 596 and minor support bars 586 may be fixed between bases 552a and 552b with bolts on one end and nuts on the other end in a similar fashion to support bars of the front rack 350 described in relation with FIG. 7.

In the illustrated arrangement of FIG. 11, each of crossbars 556 may have a pair of tongues 557 extending downward and each having at least one holes. Holes on tongues 557 can be arranged with holes on bases 552a and 552b, and crossbars 556 may be fixed on bases 552a and 552b with bolts 592 passing through holes on lips 557, holes on bases 552a and 552b, and both ends of bars 596.

FIGS. 12A, 12B and 12C are top, perspective and side views of the right-side base 552a of the front rack 550, respectively. FIGS. 12A-C also illustrate dimensions (in mm) and angle (in degrees) of one configuration of the right-side base 552a according to the description in this section or elsewhere in the specification. In other configurations, the right-side 552a may have different sizes and/or proportions to accommodate to various uses. As described elsewhere in the specification, the bases 552a and 552b may be similar with corresponding parts of the front rack 350 or the front rack 450, and the description in relation with the bases 552a and 552b in this section or elsewhere in the specification may be applied to corresponding parts in the front rack 350 or the front rack 450.

FIGS. 13A, 13B, 13C and 13D are perspective, top, front and side views of the crossbar 556 of the front rack 550, respectively. FIGS. 13B-D also illustrate dimensions (in mm) and angle (in degrees) of one arrangement of the crossbar 556 according to the description in this section or elsewhere in the specification. The illustrated crossbar 556 has planar, elongated rectangular shape, but the crossbar 556 may have different shapes or sizes to accommodate various uses. The illustrated crossbar 556 includes four holes 558 aligned symmetrically. In other arrangements, crossbar 556 may have one, two, three, five or more holes. As described elsewhere in the specification, nuts 559 are placed on the bottom surface of the crossbar, holes of nuts being aligned to holes 558. The nuts 559 may be optionally welded to the crossbar. The nuts 559 and holes 558 may be designed such that the user can reversibly fix a structure with a hole on the crossbar 556 with bolts passing through holes 558 and nuts 559. In other arrangements, the crossbar may have another suitable mechanism (e.g. hooks, magnets etc.) to hold a structure thereon. In the illustrated arrangement, the crossbar 554 may have a triangular support 554 for extra support for tongues 557.

FIGS. 14A and 14B illustrate a perspective view of the minor support bar 586 and the major support bar 596 of the front rack 550, respectively. As described elsewhere in the specification, the minor support bar 586 and/or the major support bar 596 may be threaded at both ends to receive bolts. In some arrangements, the bars 586 and 596 may be a 9 mm rod and/or threads may be M6×1.0. In some configurations, the bars may not be threaded. The major support bar 596 may be longer than the minor support bar 586. In some arrangements, the bar 586 may be 41 mm long and the bar 596 may be 140 mm long. The illustrated major support bar 596 and the illustrated minor support bar 586 may be annular and have circular cross-section, but in some arrangements, the major support bar and/or the minor support bar may have elliptical, square, rectangular, star-shaped, or any other suitable shape cross-section. As described elsewhere in the specification, the minor support bar 586 and the major support bar 596 may be similar with corresponding parts of the front rack 350 or the front rack 450, and the description in relation with the major support bar 596 and/or the minor support bar 586 in this section or elsewhere in the specification may be applied to corresponding parts in the front rack 350 and the front rack 450.

Figure 15:
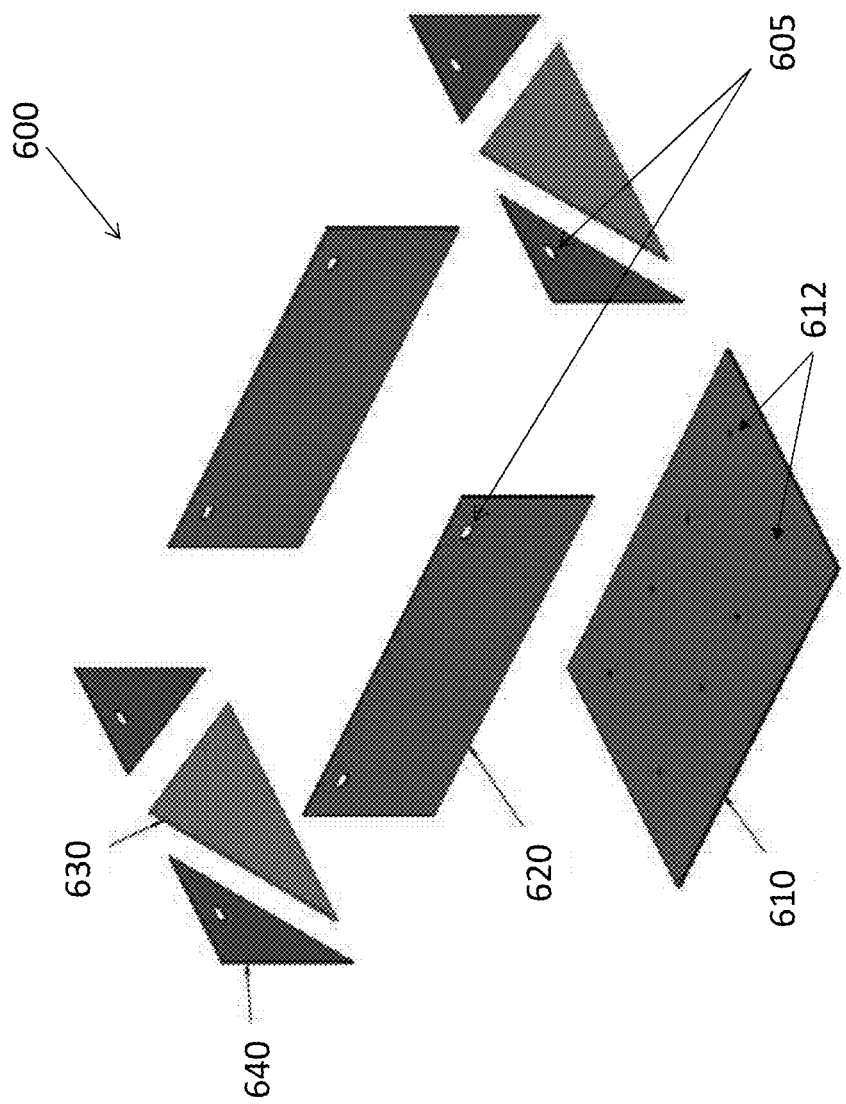
FIG. 15 is an exploded view of a perspective view of a foldable basket.
Figure 16:
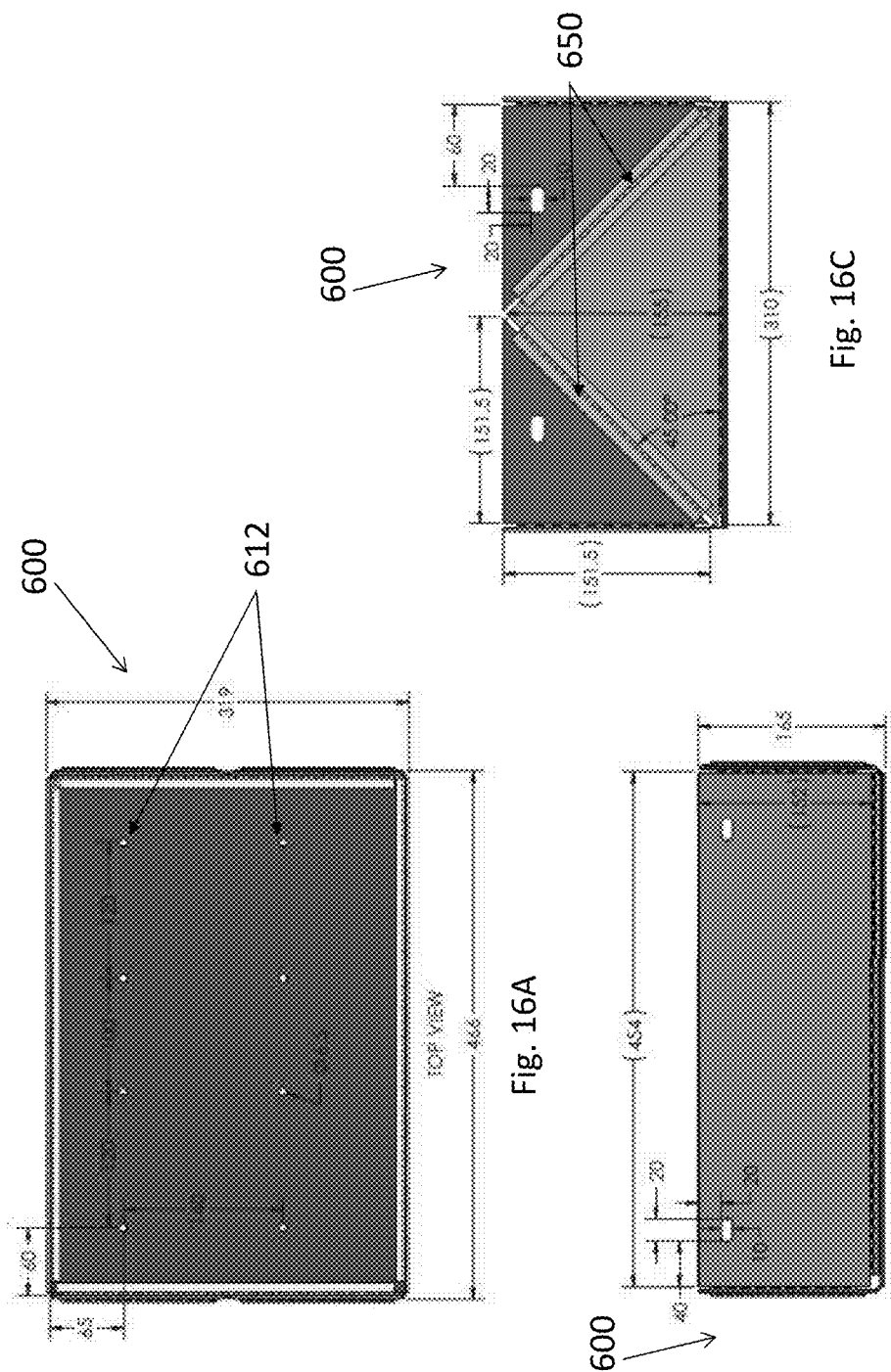
FIGS. 16A, 16B and 16C are top, front and side view of a foldable basket in its opened state, respectively.

As described elsewhere in the specification, a box or a basket may be mounted on mount support structures of a front rack, such as the front rack 550. FIGS. 15-16 illustrate an example of such a structure, a foldable basket 600. The foldable basket 600 may be reversibly folded into its folded state having a planar shape. When the user wants to carry items in the basket, the user can unfold the basket back to its opened state.

FIG. 15 illustrates an exploded view of the foldable basket 600. In the illustrated arrangement, the foldable basket 600 may include a bottom panel 610, front and back panels 620, two side center panels 630 and four side corner panels 640. The illustrated bottom panel 610 and front/back panels 620 may be rectangular, while the illustrated side center panels 630 and side corner panels 640 may be triangular. Each of panels 610, 620, 630 and 640 may be constructed from any suitable materials, including plastics, metallic wires, wood and fabrics. In some arrangements, panels may be constructed from acrylic materials. The bottom panel 610 may include holes 612 for mounting the basket 600 on the front rack of the bicycle. In some arrangements, holes 612 may be designed to be aligned to the holes of the mount support structure, such as holes 558 of the front rack 550 of FIG. 10A. In such arrangement, the basket 600 may be fixed on crossbars 556 by bolts passing through holes 612 of the basket 600, holes 558 of crossbars 556, and nuts 559 of crossbars 556. As illustrated in FIG. 15, side center panels 630 and side corner panels 640 may be designed such that a side center panel 630 and two side corner panels 640 can be combined to form one side wall of the basket 600. Each of front/back panels 620 and side corner panels 640 may include one or more slits 605 as illustrated in FIG. 15.

FIGS. 16A, 16B and 16C illustrate top, front and side views of the foldable basket 600, respectively. FIGS. 16A, 16B and 16C also illustrate dimensions (in mm) of one arrangement of the foldable basket 600 according to the description in this section or elsewhere in the specification. In other arrangements, the foldable basket 600 may have different sizes or dimensions to better accommodate various uses. The illustrated foldable basket 600 includes hinges 650 which hold panels 610, 620, 630 and 640 together. Hinges 650 may be designed such that it enables reversible folding of the basket 600 along the joint between panels, while holding panels together. In some arrangements, hinges 650 may be constructed from metals, fabrics, or any other suitable materials.

Figure 17:
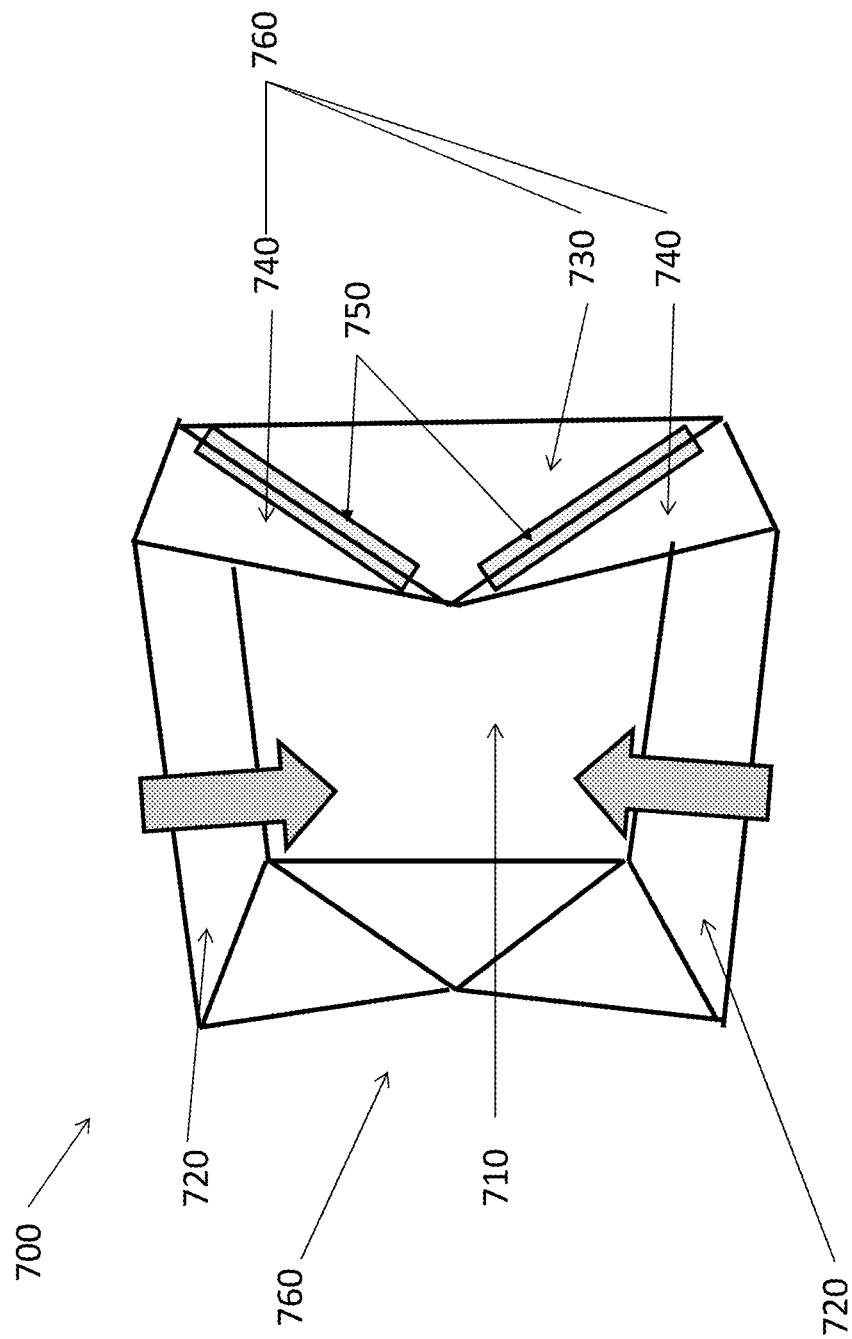
FIG. 17 is a schematic view of a foldable basket in its opened state.
Figure 18:
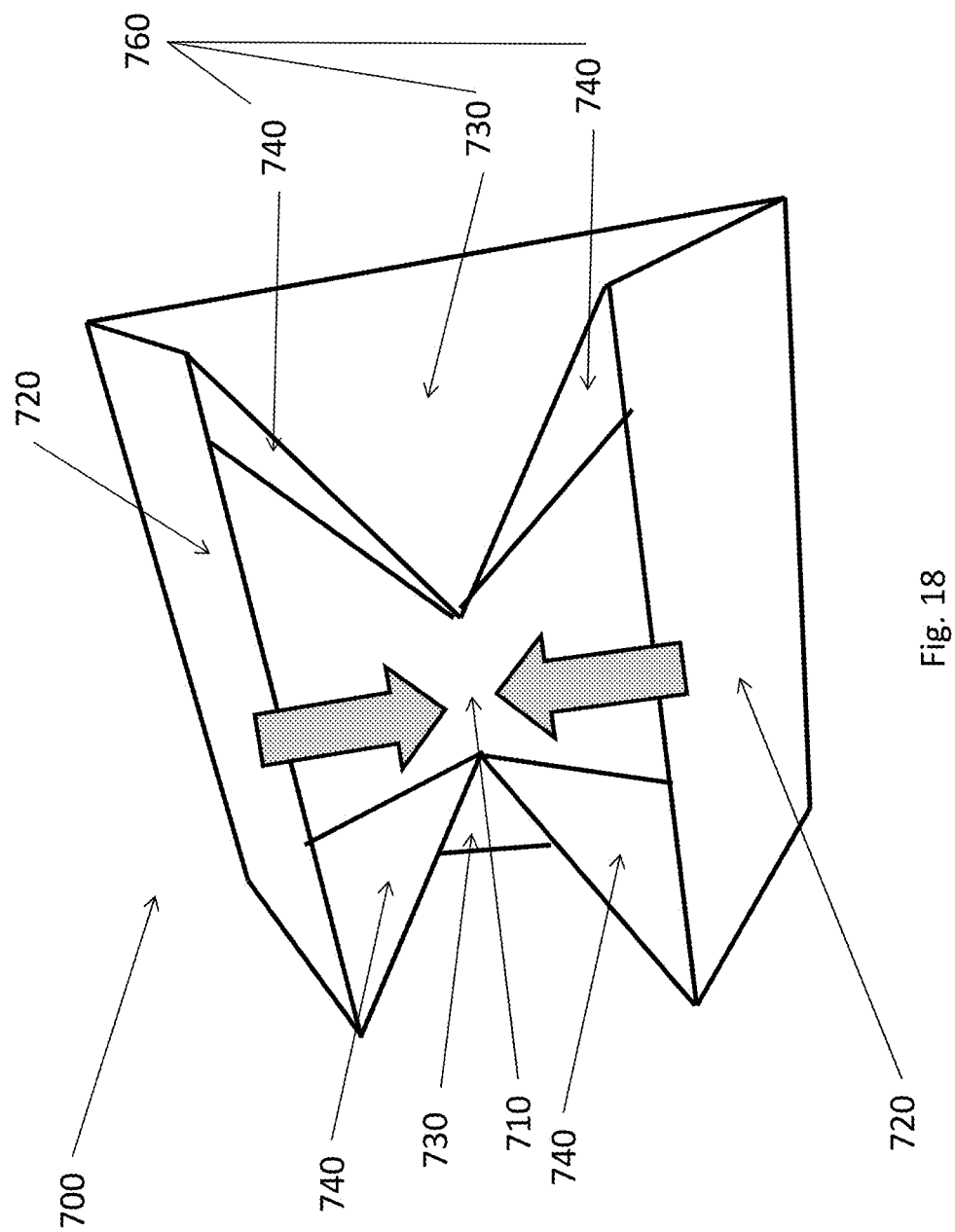
FIG. 18 is a schematic view of the foldable basket of FIG. 10 in its half-opened state.
Figure 19:
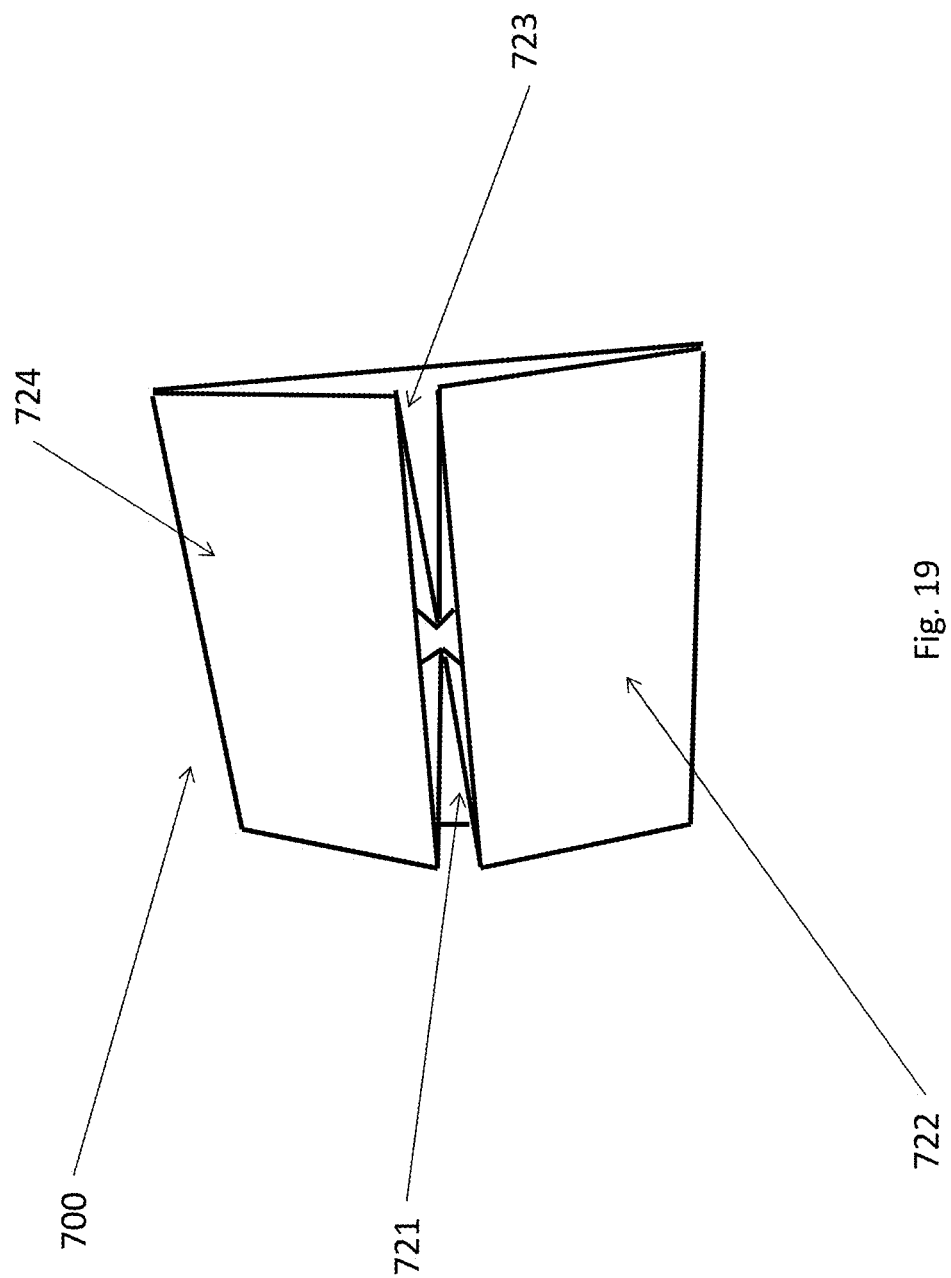
FIG. 19 is a schematic view of the foldable basket of FIG. 10 in its folded state.
Figure 20:
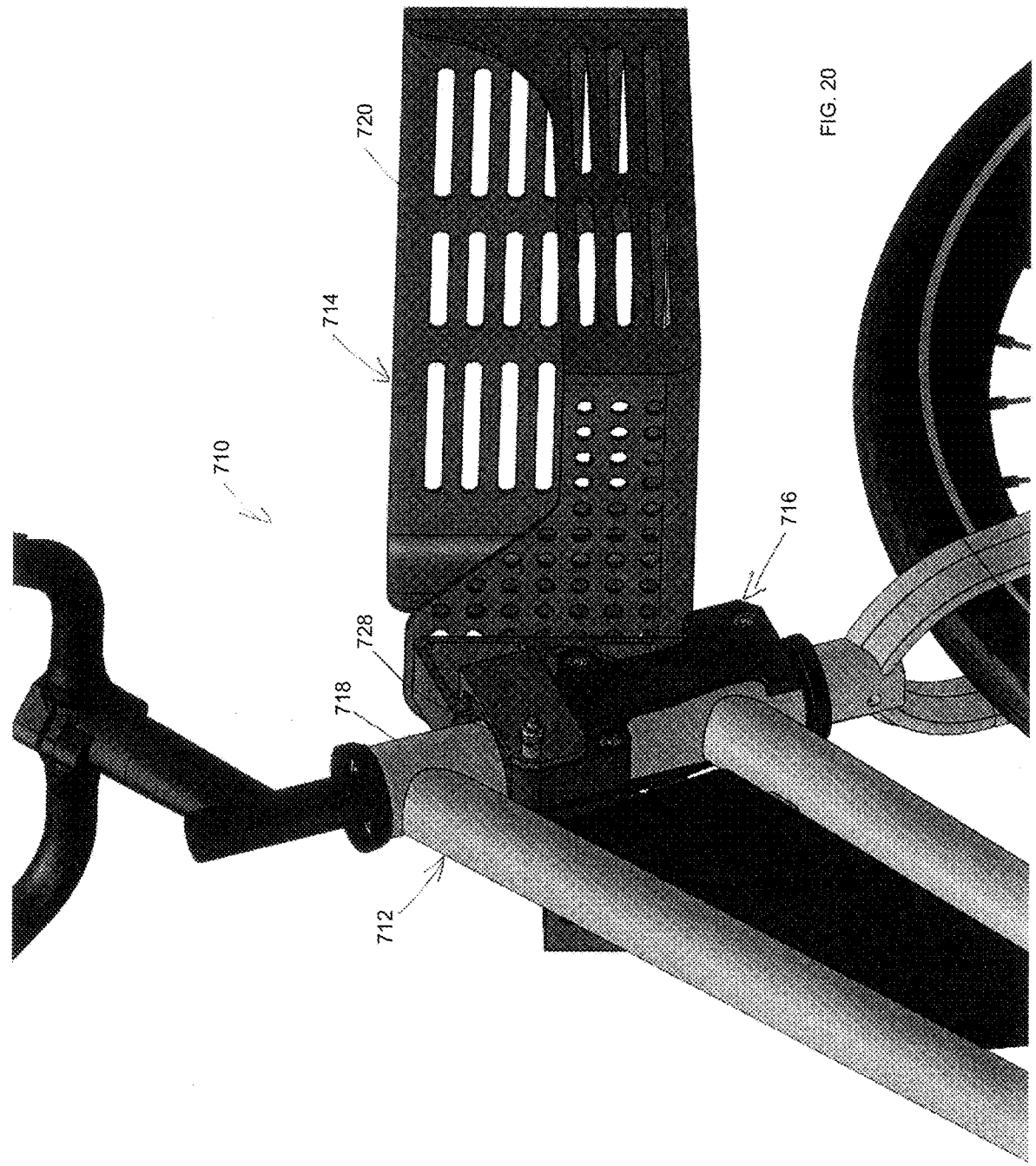
FIG. 20 is a rear perspective view of a front basket mounted to a bicycle, wherein the basket is coupled to the bicycle by an alternative mounting arrangement in comparison to FIGS. 1-19.
Figure 21:
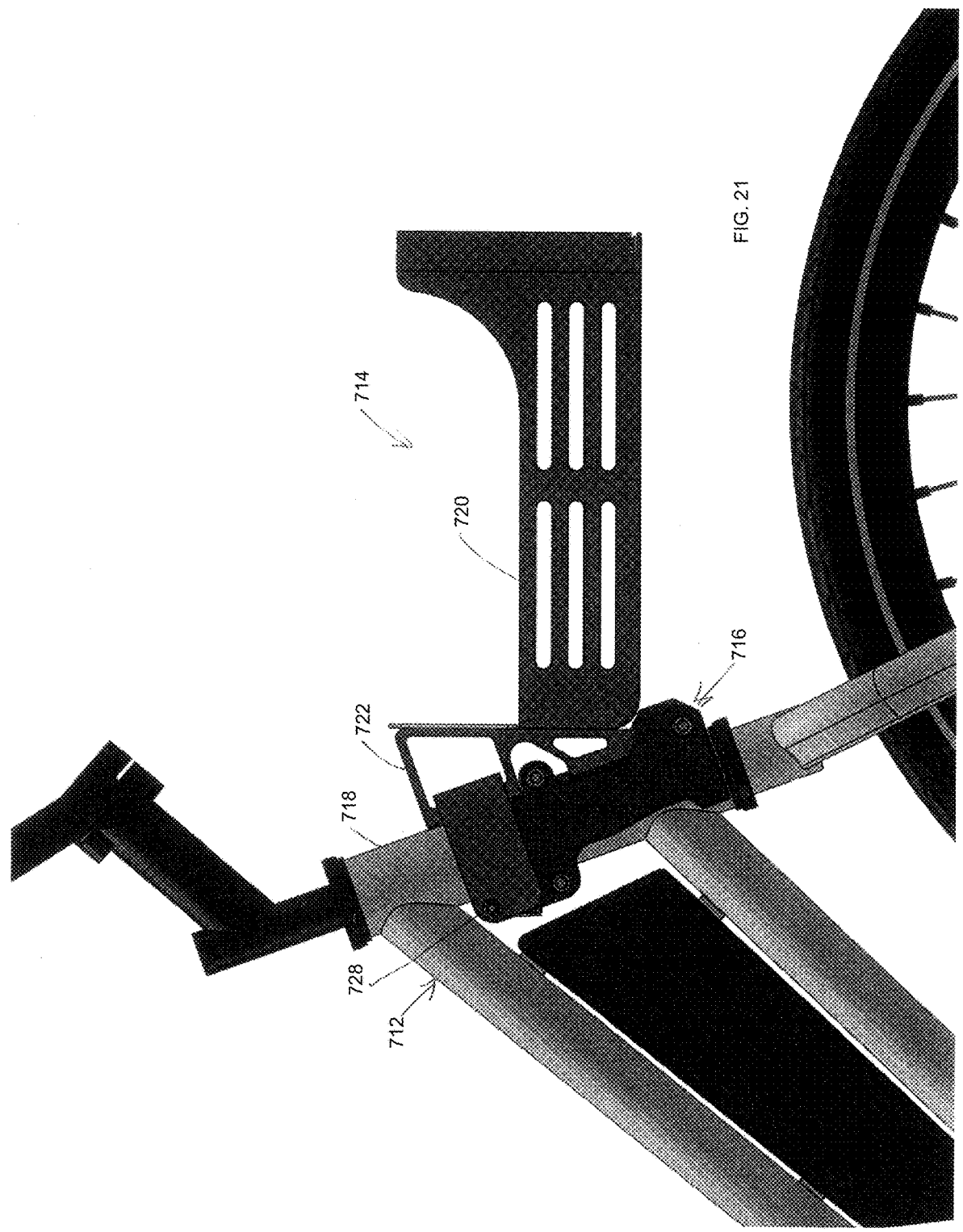
FIG. 21 is a side view of the front basket and bicycle of FIG. 20.
Figure 22:
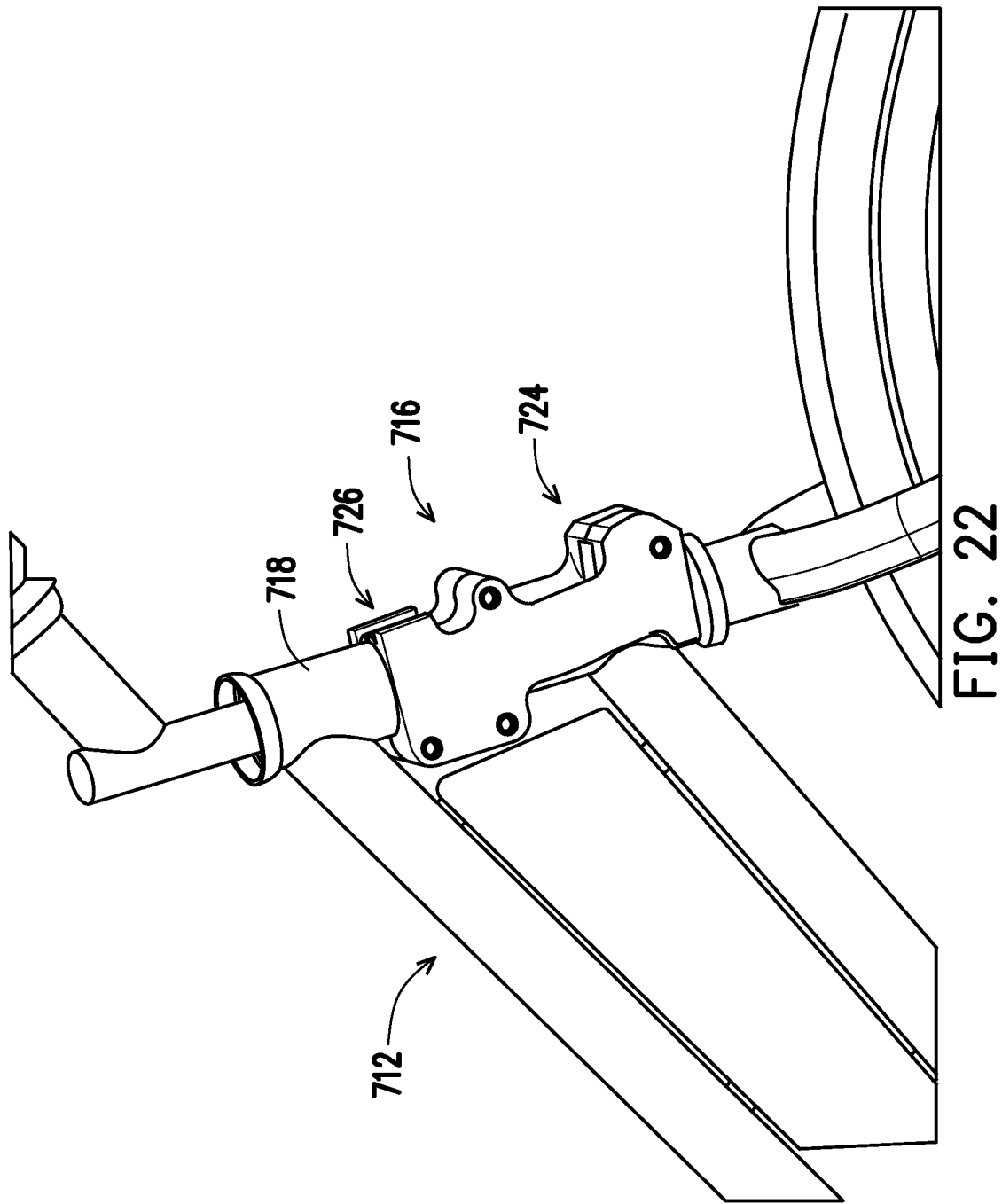
FIG. 22 is a side perspective view of a mount of the mounting arrangement for the front basket of FIG. 20.
Figure 23:
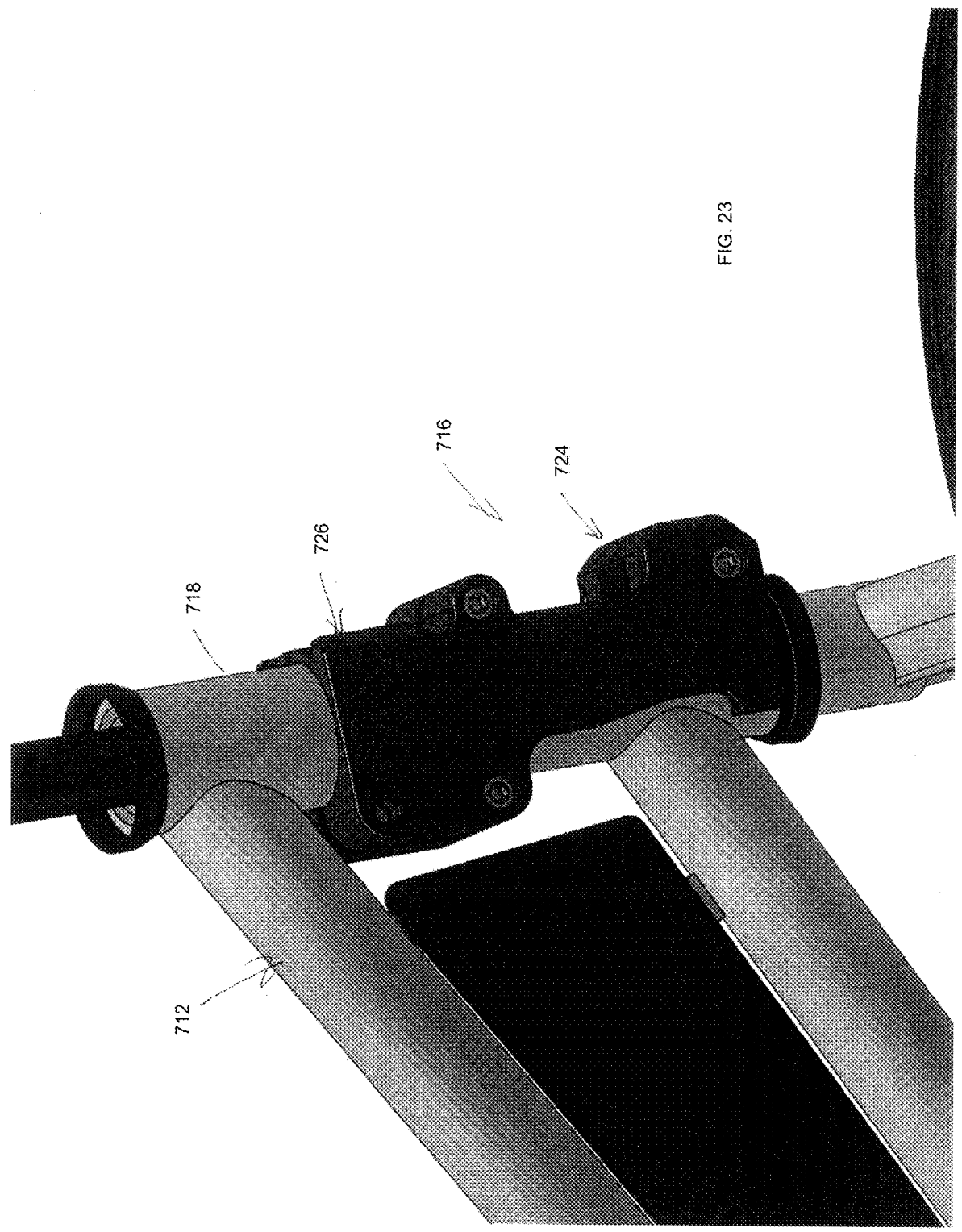
FIG. 23 is a perspective view of the side and top of the mount of FIG. 22.
Figure 24:
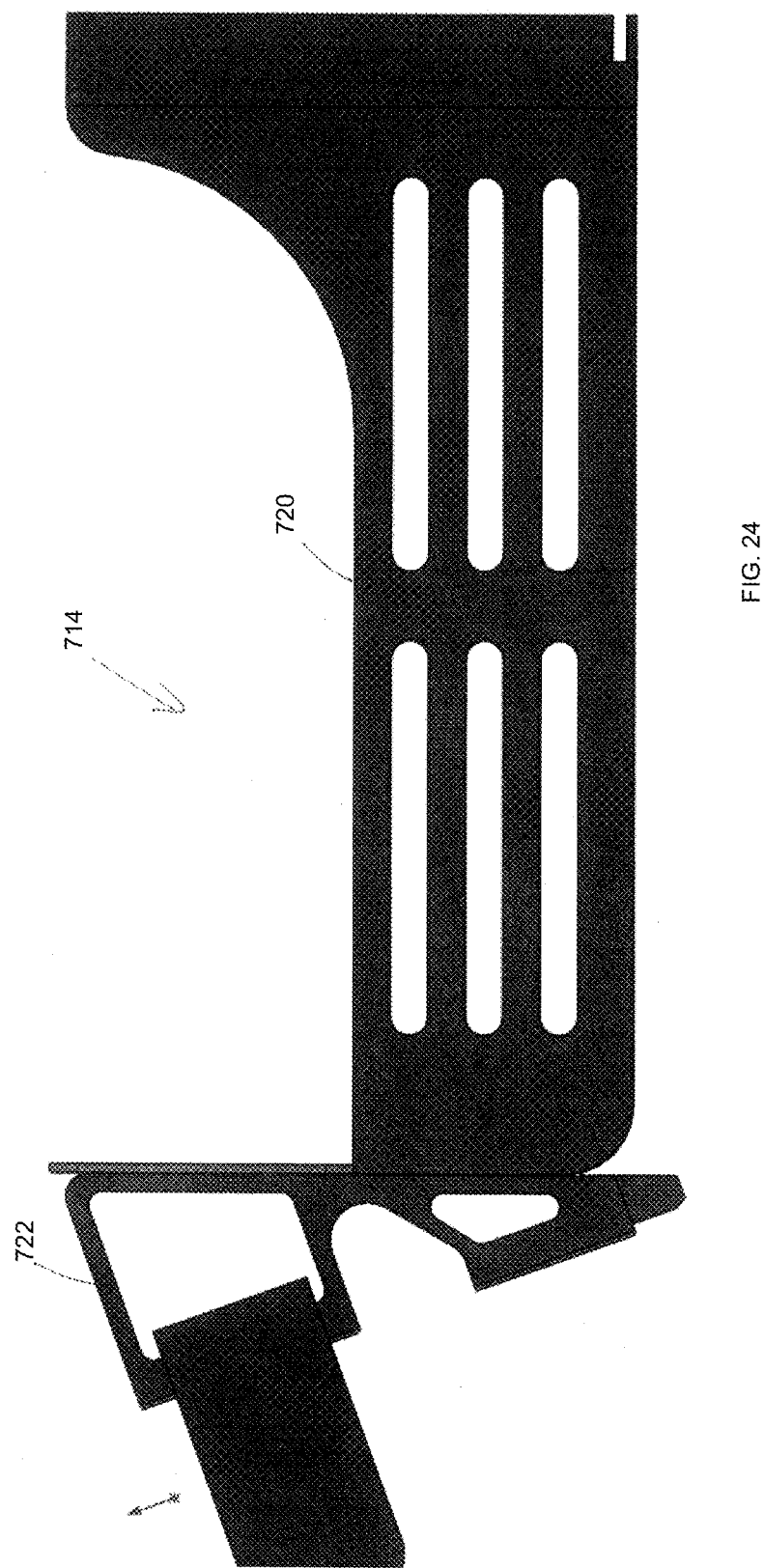
FIG. 24 is a side view of the basket and mounting arrangement of FIG. 20 shown separate from the bicycle.

FIGS. 17-19 illustrate a foldable basket 700 similar to the foldable basket 600 described in relation to FIGS. 15-16C. As described elsewhere in the specification, the foldable basket 700 may be reversibly folded into its folded state having a planar shape similar to rack shelves described in relation with FIGS. 5-9, such that it can hold wider items than the basket on the folded basket. When the user wants to carry items in the basket, the user can unfold the basket back to its opened state. The foldable basket 700 may be in its opened state which is illustrated in FIG. 17, in its folded state which is illustrated in FIG. 19, or its half-opened state which is illustrated in FIG. 18. The illustrated foldable basket 700 includes a bottom panel 710, front and back panels 720, two side center panels 730 and four side corner panels 740, wherein a side center panel 730 and two side corner panels 740 forms a side wall 760. Front and back panels 720 are opposing each other, and two side walls 760 are opposing each other. Each panel may be connected to others with hinges 750 which may be similar to hinges 650 described in relation to FIGS. 16A-C. As shown in FIG. 18, side walls 760 may be folded about hinges 750. In other arrangements, the foldable basket may have other suitable mechanisms for folding. In its folded state, as illustrated in FIG. 19, side walls 760 may be collapsed over front and back panels 720 and the bottom panel 710, such that the basket 700 has a planar shape overall. The foldable basket may be constructed from various materials. In some configurations, the foldable basket may be constructed from acrylic panels or metallic wires. The foldable basket may include mechanisms such as spring load functions, such that the basket can be easily and reversibly folded and opened.

Removable Basket Assembly of FIGS. 13-19

In some embodiments, basket can be removably coupled to the frame of a bicycle. FIGS. 20-26 illustrate a removable basket assembly 710 for a bicycle 712 including a basket 714 of any suitable size or shape. The bicycle 712 may be similar with bicycles described in relation with FIGS. 1-19 or elsewhere in this specification. The removable basket assembly 710 also includes a bracket 716 that can be affixed to the bicycle 712 and at least partially supports the basket 714. In some configurations, the bracket 716 is affixed to a head tube 718 of the bicycle 712. The basket 714 can include a receptacle or basket portion 720 and an attachment portion 722.

The illustrated bracket 716 includes a support portion 724 that supports a portion of the basket 714, such as the attachment portion 722. The support portion 724 can comprise a support surface that provides vertical support to the basket 714. In the illustrated arrangement, the support portion 724 comprises a recess that receives a portion of the attachment portion 722 of the basket 714. The recess and cooperating portion of the basket 514 can comprise a wedge shape such that the bracket 716 retains the basket 714 in a fore-and-aft direction or toward and away from the head tube 718.

The bracket 716 also includes a retention portion 726 that is configured to retain a portion of the basket 714 and inhibit movement of the basket 714 in a fore-and-aft direction or toward and away from the head tube 718 of the bicycle 712. The retention portion 726 can retain the basket 714 by any suitable arrangement, such as a locking element (e.g., locking pin 728) in the illustrated arrangement. A portion of the attachment portion 722 can overlap or surround a portion of the bracket 716. Each of the attachment portion 722 and the bracket 716 can include an opening or passage that receives the locking pin 728, which can be a quick-release type locking pin 728.

In use, the attachment portion 722 of the basket 714 can be placed onto, into or otherwise in contact with the support portion 724 of the bracket 716. The basket 714 can be lean backwards or moved toward the head tube 718 of the bicycle 712 until the attachment portion 722 is aligned with the bracket 716 such that the locking pin 728 can be passed through the aligned openings of the attachment portion 722 and bracket 716 to secure the basket 714 to the bracket 716.

Such an arrangement secures the basket 714 to the bracket 716 at two spaced locations to provide a sturdy connection between the two. In the illustrated arrangement, the support portion 724 is positioned below the retention portion 726; however, in other arrangements, the support portion 724 can be positioned above the retention portion 726.

The bracket 716 can be affixed to a suitable portion of the bicycle 712, such as the head tube 718, by any suitable arrangement. In one configuration, the bracket 716 comprises multiple pieces that can be connected to one another in a clamping arrangement about the head tube 718. The bracket 716 can be split in a vertical direction or along an axis of the head tube 718. The bracket 716 can have two halves that are connected to surround the head tube 718 or can have more than two pieces. In some configurations, the bracket 716 is a single piece that is clamped to the head tube 718 by suitable clamp members. If desired, the support portion 724 and the retention portion 726 can be integrated into a portion of the bicycle frame, such as the head tube 718.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A bicycle, comprising:
a front wheel;
a rear wheel; and
a frame supporting the front wheel and the rear wheel, wherein the frame comprises a bottom bracket defining an axis;
a pedal crank assembly supported for rotation about the axis and comprising a drive gear;
a driven gear rotationally coupled to the rear wheel;
a drive member or arrangement that couples the drive gear to the driven gear;
wherein the frame comprises a vertical plate having one or more through-holes, the vertical plate comprises a mounting surface adjacent to or surrounding the one or more through-holes, wherein the mounting surface receives a mounting portion of an attachment structure;
one or more fasteners, wherein each fastener passes through one of the one or more through-holes to secure the attachment structure to the vertical plate,
wherein the attachment structure is a front cargo carrier, wherein the cargo carrier comprises a pair of bases each having the mounting portion and extending to a front side of the bicycle from the mounting portion,
wherein the front cargo carrier further comprises a mount support structure mounted on the pair of bases, wherein the mount support structure comprises a mechanism configured to reversibly hold another structure thereon.

2. The bicycle of claim 1, wherein the vertical plate comprises a pair of through-holes.

3. The bicycle of claim 1, wherein the front cargo carrier further comprises a rack shelf mounted on the pair of bases, wherein the shelf is configured to hold cargo thereon.

4. The bicycle of claim 3, wherein the rack shelf comprises a plurality of bars.

5. The bicycle of claim 1, wherein the mount support structure comprises an elongated rectangular shaped bar.

6. The bicycle of claim 1, wherein the front cargo carrier further comprises a basket mounted on the pair of bases, wherein the basket is configured to hold cargo therein.

7. The bicycle of claim 6, wherein the basket is reversibly foldable and is configured to have a planar shape when the basket is completely folded.

8. The bicycle of claim 7, wherein the basket comprises a bottom panel, a front panel, a back panel and two side walls, wherein each side wall comprises a side center panel and two side corner panels, wherein the basket comprises at least one hinge connecting two of the bottom, front, back, side center and side corner panels.

9. A bicycle, comprising:
a front wheel;
a rear wheel;
a frame supporting the front wheel and the rear wheel, wherein the frame comprises a bottom bracket defining an axis;
a front cargo carrier, wherein the cargo carrier comprises a pair of bases each having a mounting portion and extending to a front side of the bicycle from the mounting portion;
wherein the frame comprises a vertical plate having one or more through-holes, the vertical plate comprises a mounting surface adjacent to or surrounding the one or more through-holes,
wherein the mounting surface receives the mounting portion of each of the pair of bases of the front cargo carrier; and
one or more fasteners, wherein each fastener passes through one of the one or more through-holes to secure the pair of bases of the front cargo carrier to the vertical plate,
wherein the front cargo carrier further comprises a mount support structure mounted on the pair of bases, wherein the mount support structure comprises one or more through-holes from a top surface to a bottom surface.

10. The bicycle of claim 9, wherein the front cargo carrier further comprises a basket reversibly mounted on the top surface of the mount support structure, wherein the basket is configured to hold cargo therein.

11. The bicycle of claim 10, wherein the basket comprises the bottom surface having through-holes, the through-holes of the bottom surface configured to be aligned with the through-holes of the mount support structure and receive fasteners to fix the basket on the mount support structure.

12. The bicycle of claim 10, wherein the basket is reversibly foldable and is configured to have a planar shape when the basket is completely folded.

* * * * *